(12) United States Patent
Hau

(10) Patent No.: US 10,257,894 B2
(45) Date of Patent: Apr. 9, 2019

(54) PHASE CUT DIMMING CONTROL AND PROTECTION

(71) Applicant: King Kuen Hau, Hong Kong (CN)

(72) Inventor: King Kuen Hau, Hong Kong (CN)

( * ) Notice: Subject to any disclaimer, the term of this patent is extended or adjusted under 35 U.S.C. 154(b) by 0 days.

(21) Appl. No.: 15/324,714

(22) PCT Filed: Jul. 28, 2015

(86) PCT No.: PCT/IB2015/055681
§ 371 (c)(1),
(2) Date: Jan. 8, 2017

(87) PCT Pub. No.: WO2016/016797
PCT Pub. Date: Feb. 4, 2016

(65) Prior Publication Data
US 2017/0208659 A1    Jul. 20, 2017

Related U.S. Application Data

(60) Provisional application No. 62/031,232, filed on Jul. 31, 2014, provisional application No. 62/036,642, (Continued)

(51) Int. Cl.
*H05B 33/08* (2006.01)
*H05B 37/02* (2006.01)
*H05B 39/04* (2006.01)

(52) U.S. Cl.
CPC ....... *H05B 33/0845* (2013.01); *H05B 33/089* (2013.01); *H05B 33/0815* (2013.01);
(Continued)

(58) Field of Classification Search
None
See application file for complete search history.

(56) References Cited

U.S. PATENT DOCUMENTS

| 4,429,339 A | 1/1984 | Jaeschke et al. |
| 5,691,605 A * | 11/1997 | Xia ................. H05B 37/0263 315/224 |

(Continued)

*Primary Examiner* — Crystal L Hammond

(57) ABSTRACT

A phase cut dimmer, coupled between an AC power source and a load, to control the amount of power delivered from the power source to the load, comprising: a dimmer switch to turn on and off the current from the power source to the load; the dimmer switch being an AC switch formed of a first MOSFET and a second MOSFET connected in anti-series; the two source electrodes of the MOSFETs being connected together to form a common source terminal and the two gate electrodes of the MOSFETs being connected together to form a switch control terminal; a line filter bypassing very low current at the line frequency; a rectifier to convert the AC voltage from the power source to pulsating DC voltage which is coupled to the dimmer switch; a very low power unipolar zero detector extracting a zero marker signal from the pulsating DC voltage; the unipolar zero detector comprising a voltage-controlled bleeder impedance, a comparator, a pulse generator, wherein the voltage-controlled bleeder impedance is coupled to the pulsating DC voltage whereby the bleeder impedance is controlled proportional to the instantaneous value of the voltage; the pulsating DC voltage is compared to a reference close to zero level by the comparator, triggering the pulse generator to generate the zero marker signal when the voltage is lower than the reference; a very low power adjustable timer to control the dimmer switch in synchronization with the zero marker signal.

22 Claims, 14 Drawing Sheets

Related U.S. Application Data filed on Aug. 13, 2014, provisional application No. 62/038,307, filed on Aug. 17, 2014.

(52) U.S. Cl.
CPC ....... *H05B 37/0281* (2013.01); *H05B 39/048* (2013.01); *Y02B 20/148* (2013.01)

(56) References Cited

U.S. PATENT DOCUMENTS

| | | | |
|---|---|---|---|
| 8,040,070 B2 * | 10/2011 | Myers | H05B 33/0815 |
| | | | 315/209 R |
| 8,115,517 B2 | 2/2012 | Hallak | |
| 8,536,799 B1 * | 9/2013 | Grisamore | H05B 33/0815 |
| | | | 315/185 R |
| 8,884,656 B2 | 11/2014 | Braunshtein | |
| 9,161,418 B2 | 10/2015 | Newman | |
| 2012/0033471 A1 * | 2/2012 | Newman, Jr. | H05B 33/0815 |
| | | | 363/126 |
| 2012/0056553 A1 * | 3/2012 | Koolen | H05B 33/0815 |
| | | | 315/291 |
| 2012/0119652 A1 * | 5/2012 | Deurenberg | H05B 33/0815 |
| | | | 315/126 |
| 2013/0113391 A1 * | 5/2013 | Mercier | H05B 33/0809 |
| | | | 315/291 |
| 2013/0229121 A1 * | 9/2013 | Otake | H05B 33/0815 |
| | | | 315/200 R |
| 2016/0212806 A1 * | 7/2016 | Malyna | H05B 33/0845 |

* cited by examiner

PHASE CUT DIMMING CONTROL AND PROTECTION

BACKGROUND OF THE INVENTION

Field of Invention

The present invention relates generally to apparatus and methods for phase cut AC power control, in particular for the control and protection of the phase cut dimming system.

Description of the Related Art

In the process of AC (Alternating Current) power control, switches are often deployed to turn on and to turn off the current flow in one direction or the other. As such, we call these switches AC switches for their ability to handle the flow in either directions. In particular for phase cut power control, such as dimmers, AC switches are commonly implemented by thyristors or anti-series connected pair of MOSFETs or IGBTs. A thyristor may also be used as an AC switch, but has the property that once it is triggered on by a gate signal, it will be rather difficult to turn it off through the gate control. It will stay on until the current flow drops to a level lower than a specific value called its holding current. On the other hand, an AC switch formed of a pair of MOSFETs or IGBTs can be easily turned on and off by gate signaling. Therefore, thyristors work well in the leading edge dimmers but not in the trailing edge dimmers, for which the AC switch is required to be turned off at any phase angle. On the other hand, the AC switches formed of a pair of MOSFETs or IGBTs do not have such limitation.

FIG. 1 depicts the operation of a phase cut dimmer DIMM as prior art AC power control system. As shown the load of the dimmer DimLOAD, such as a lighting device, is connected between the AC power supply voltage VAC and the dimmer DIMM in series, in a so-called two-wire configuration. The dimmer is shown in its three major components, namely the low pass filter FIL, the dimmer controller DimCon, and the AC switch ACSW.

The filter FIL is to block the transmission of high frequency EMI (Electromagnetic Interference) between the AC power supply/load and the dimmer. The EMI causes waveform distortion of the AC voltage and may therefore affect the accuracy in zero crossing detection which in turn causes problem in phase synchronization of dimming control. Different types of filters, with inductors, capacitors, or even resistors, and in different configurations, are available as myriad choices of design. Whatever the design used, there will in general be some "leakage" of current, labeled Ifil in the diagram, at the line frequency, through the filter and through the load back to the AC supply. This "leakage" is out of control by the dimmer and is therefore not desirable if the "leakage" is significantly large compared to the normal load current.

By physical connection, the dimmer controller DimCon receives both power and synchronization signal from the two terminals T1 and T2 of the AC switch ACSW. From DimCon, a switch control signal ONsw is generated to turn the AC switch ACSW on and off in synchronization with the supply AC at a duty cycle determined by an adjustable dimming control signal Dim.

As shown, the dimmer controller DimCon draws a current Iaux from the two terminals T1 and T2 of the AC switch ACSW. Therefore, from the block diagram of FIG. 1, it can be seen that the load current is Iac where Iac=Ifil+Iacf=Ifil+Iaux+Isw, Isw being the current through the AC switch ACSW.

Now Isw is the only part under the control by the dimmer. Any time, even the AC switch ACSW is completely switched off in the maximum dimming condition, currents Ifil and Iaux remain flowing through the load DimLOAD. Therefore we have the undesirable situation of not being able to dim the light, as the load, to a low level as we wish because of the presence of the uncontrollable currents Ifil and Iaux.

The problem becomes serious when the lighting load is small, such as for a small high efficiency LED lamp for example. Suppose the light is rated at 3 W at 220V, the theoretical full load current of the LED light, assuming unity power factor, is 13.6 mA. If the uncontrollable current Ifil+Iaux amounts to 3 mA, then the lowest power the LED light can be dimmed down to is 0.66 W, i.e. only 22% of full rated power. This is highly unsatisfactory but as a matter of fact it is the norm in the existing market. Majority of the dimmers in the market are specified for a minimum loading of 10 W or higher up to 50 W. This is far from meeting the need of the market for the many LED lamps which are rated below 10 W.

It is therefore highly desirable to develop dimmers of very low power consumption, i.e. low Ifil and Iaux as shown in FIG. 1, in order to take care of the application range of the dimmers of low power lights. Power requirement of each of the components of the dimmer control unit will need to be examined one by one with a view for improvements toward this goal. For example, if we wish to dim a 3 W 220V light to a minimum level of 1%, i.e. 0.03 W, we would expect that the dimmer is then consuming at most 0.03 W at say half of the line voltage, for a current of 0.03 W/110V=273 uA. This is taken as the maximum level of current Ifil plus Iaux allowed for the dimmer to dim the 3 W light down to 1%.

There is yet another challenge to designers of phase cut dimmers, i.e., the large transient current at power up, or at fault or over-temperature conditions. To address these problems, there are many prior art circuits for such as rush current suppressors, over-current, short-circuit and over-temperature protectors, etc. However many of them are either complicated, costly and worse still, consuming considerable amount of power and therefore not feasible for two-wire dimmers intended for low power lights.

SUMMARY OF THE INVENTION

It is therefore the intention of the present invention to develop a structurally simple and yet very efficient dimmer consuming very little power so that in a two-wire configuration the dimmer can still work well for low power loads such as those small high efficiency LED lights now getting popular in the market. At the same time, over-current and over-temperature protection capabilities are to be designed in without raising the total power consumption of the dimmer itself.

In a preferred embodiment of the present invention, the phase cut dimming apparatus is comprised of an AC switch formed of a first MOSFET and a second MOSFET connected in anti-series, each MOSFET with intrinsic body diode connected anti-parallel to drain and source electrodes respectively; the two source electrodes of the MOSFETs being connected together to form a common source terminal; a low power detection circuit of the unipolar zero level transition of the rectified AC voltage across the AC switch, generating there from a zero marker signal as timing reference; a timer for setting the phase cut timing of the dimmer, the timer being a low power monostable multivibrator synchronized to the zero marker signal; the phase cut timing being controllable by a variable resistor as the dimming control device; a low pass filter to remove the high frequency noise associated with the line voltage input to the dimmer, the filtering network bypassing little current; a low power detector circuit comprising a single transistor performing multiple functions of:

1 Detecting over-current condition of the AC switch by monitoring negative drain voltage of the MOSFETs with respect to the common source terminal;

2 Detecting over-temperature condition of the AC switch by monitoring the positive drain voltage of the MOSFETs with respect to the common source terminal;

3 In circuit interaction with the MOSFETs to latch the AC switch open once it is triggered to open under a minimum holding drain voltage; and a wide input range and low power consumption voltage regulator providing DC power supply from the voltage drop across the AC switch.

Note that by rectification action of the intrinsic diodes associated with the two MOSFETs forming the AC switch, voltages acting on the drain electrodes of the MOSFETs and the control circuit are always positive (hence the term "unipolar") with reference to the common source terminal. Direct detection of "zero crossing", i.e. traversing the zero voltage level between positive and negative polarities, for phase synchronization within the dimmer circuit is therefore not feasible. However at the moment of "zero crossing" of line voltage, the rectified voltage will always show a "dip" towards the zero level, despite that the "dip" may be blurred by the stored charge in the capacitance coupled to the output of the rectifying circuit. By removing the charge close to the moment of "zero crossing", the "dip" may be clearly revealed for phase synchronization. Then the "charge free" voltage at the rectifier output will be monitored for transition to or from the zero level, signifying the "zero crossing" point. The detector circuit as an embodiment of the present invention will be termed "unipolar zero detector", UZD for short, in the detailed description of the invention.

FIG. 2 is a block diagram showing the major components of a phase cut dimmer as an embodiment of the present invention. Dimmer control is through an AC switch ACSW formed by two MOSFETs Q1 and Q2 connected anti-series and each with intrinsic body diodes D1 and D2 connected anti-parallel to drain and source electrodes respectively. Two optional resistors R1 and R2 are inserted between the source electrodes and the common ground. It is to be understood that these are not essential for the performance of the dimmer, but simply may provide an optional way to adjust (increase) the sensitivity of current sensing for over-current protection.

Note that alternative to the phase cut dimmer by an AC switch (which might be called an AC switching dimmer), there is in the prior art the design by which full wave rectification is performed on the AC line input first, followed by the phase cut switching by a DC switch, such as a single MOSFET. By this design (which might be called a DC switching dimmer), one MOSFET is saved at the cost of four rectifier diodes and extra power dissipation due to the voltage drop on the diodes. Nevertheless unipolar zero detection is still required for AC synchronization. However all the benefits of the present invention are equally applicable to both AC and DC switching dimmers, the latter as depicted by the block diagram of FIG. 9.

Note also that MOSFETs are deployed for their positive temperature coefficient in channel resistance as required for over-temperature sensing and protection as in some of the embodiments of the present invention. For other embodiments without this feature, some other semiconductor switching devices, such as IGBTs, BJTs etc., may be used instead of MOSFETs. External anti-parallel diodes will need to be included in the AC switch circuit for the case that BJTs or IGBTs instead of MOSFETs are deployed.

The dimmer controller DimCon, as referred to in FIG. 1, is shown in FIG. 2 with more details with its three functional blocks: the DC power supply DCP, the unipolar zero detector UZD, and the dimming time controller TIM. Further, the dimmer protection unit PRO, not usually found in prior art designs and therefore not shown in FIG. 1, is presented here. The output of the protection unit PRO can disable the switch on signal ONsw from the dimmer controller DimCon by a low signal to the input of the AND-gate &G, turning low the signal at terminal G which connects the two gates of the MOSFETs Q1 and Q2.

It has been explained that to achieve high dimming, the bypass current Ifil through the low pass filter FIL, plus the auxiliary current Iaux driving the DC power supply DCP, the unipolar zero detector UZD, and the dimming time controller TIM, now also the dimmer protection unit PRO, should be made sufficiently low in comparison to the load current. Each of the above functional components has been examined in details and redeveloped according to the principles of the present invention to be elaborated in the following.

BRIEF DESCRIPTION OF THE DRAWINGS

With the foregoing in view, as other advantages as will become apparent to those skilled in the art to which this invention relates as this patent specification proceeds, the invention is herein described by reference to the accompanying drawings forming a part hereof, which includes descriptions of some typical preferred embodiments of the principles of the present invention, in which.

DETAILED DESCRIPTION OF THE INVENTION

Figure 1:
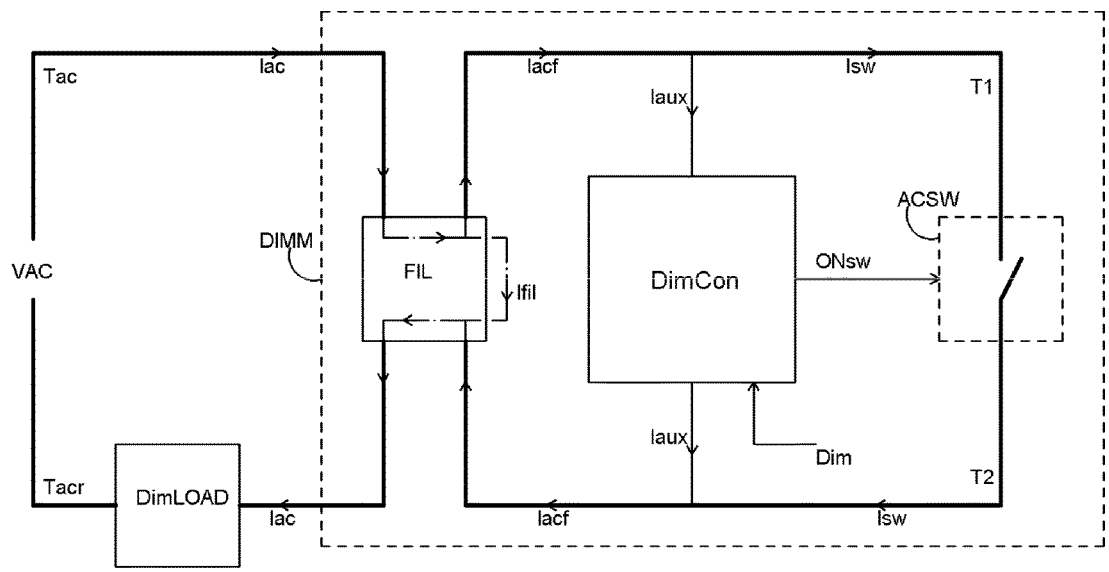
FIG. 1 is a block diagram of a prior art phase cut dimmer
Figure 2:
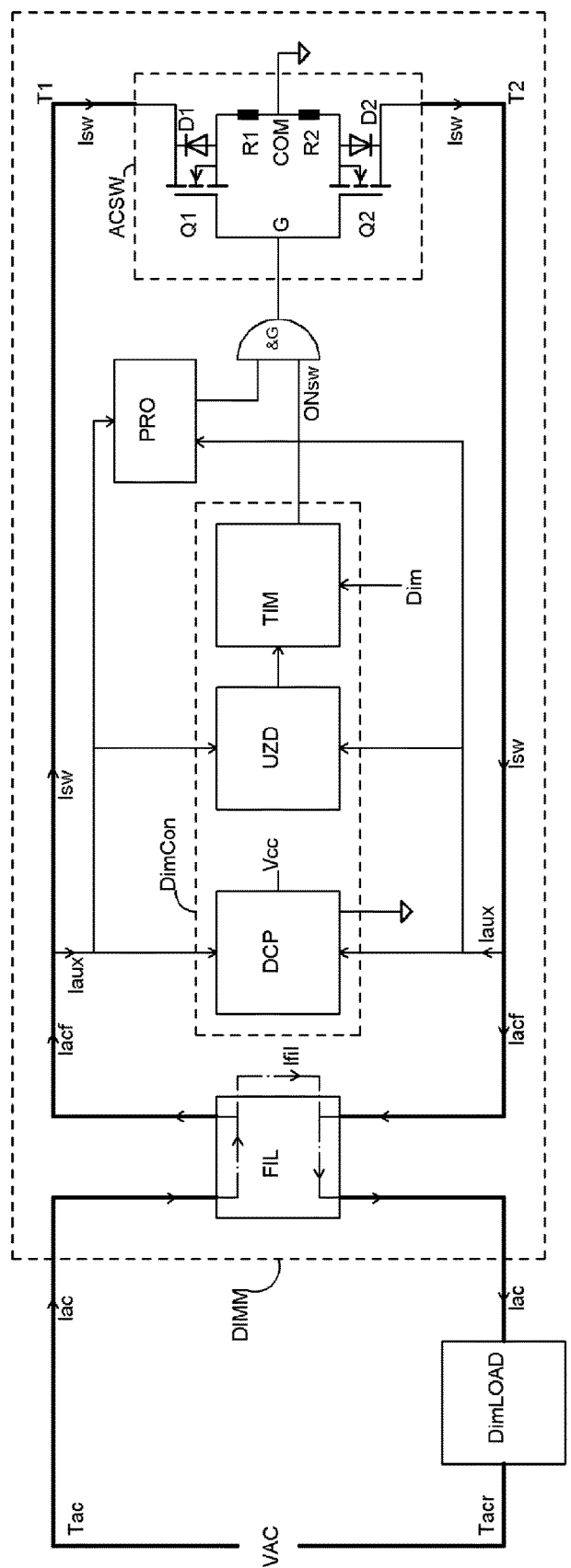
FIG. 2 is a block diagram showing the major components of an AC switching phase cut dimmer as an embodiment of the present invention

The major components of a phase cut dimmer as an embodiment of the present invention has been described in accordance with the block diagram of FIG. 2. Apart from achieving the various functions of the components, it will be emphasized in the following description the vital importance of reducing the power consumption of each of these components.

Figure 3:
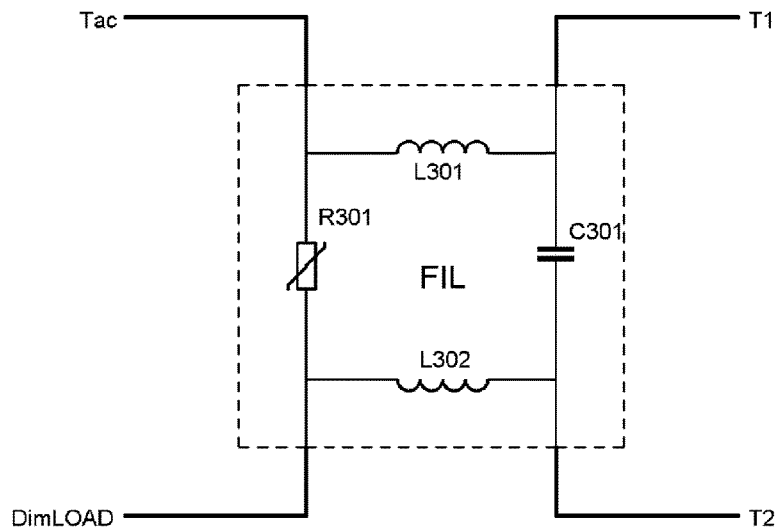
FIG. 3 is an exemplary circuit for the low pass filter as depicted in FIG. 2

FIG. 3 is an exemplary circuit for the low pass filter FIL as depicted in FIG. 2. R301 is a varistor or the like for suppressing excessive transient voltage pulses and under normal supply voltage conditions it will not be drawing any current. The only path as shown inside the filter to "leak" current is through the capacitor C301. For example, a capacitance of 33 nanofarad will pass around 2.3 mA at 220V/50 Hz. This might be considered too high for dimming low power lights such as those rated at 1 W and drawing only 4.5 mA at full power. To improve, nothing else seems to be possible other than reducing the capacitance value of C301, with a side effect of lowering the capability of filtering in high frequency noise. However, increasing the inductance of inductors L301 and/or L302 can compensate for the loss in high frequency filtering, without much bad effect on the load current at the line frequency. It is therefore a matter of design to compromise between the component values. It will be understood that as in general in designing a low pass LC filter, a higher L/C ratio (inductance to capacitance ratio) is preferred for lower filter "leak" currents and is therefore recommended to be adopted for the present invention.

Figure 4:
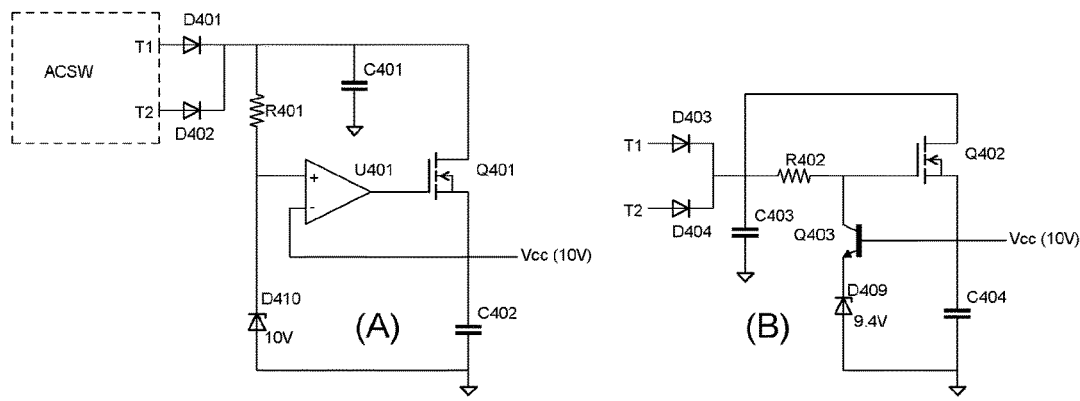
FIG. 4 shows two exemplary circuits for the DC power supply unit as depicted in FIG. 2

FIGS. 4(A) and (B) are two exemplary circuits for the low standby current DC power supply unit as depicted in FIG. 2. With reference to FIG. 4(A), the regulator provides a stable low DC voltage Vcc from a wide range of input voltages (say from a few volts to 400V peak dependent on the degree of dimming) obtained from the drain electrodes T1 and T2 of the MOSFETs forming the AC switch ACSW. A low power consuming comparator U401 compares the DC output voltage Vcc with a reference voltage Vref, of say 10V, and the output of the comparator controls the MOSFET Q401 to keep the output voltage Vcc constant. To keep the standby supply power low, the type of operational amplifier U401 needs to be chosen for low supply current. Further the resistor R401 needs to be of high impedance value. The capacitors C401 and C402 help to smooth the output of the regulator output Vcc.

FIG. 4(B) shows a simple and practical circuit providing the same function as the circuit shown in FIG. 4(A). The Zener diode D409 together with the base-emitter drop of transistor Q403 provides a reference voltage of say around 10V. Transistor Q403 is playing a role as the comparator U401 in FIG. 4(A) to control the MOSFET Q402. By choosing a high impedance value for the resistor R402, the standby current of the wide input range voltage regulator can be made very low.

Note that MOSFETs are used for both circuits of FIG. 4(A) and FIG. 4(B) for their very high input impedance and hence very low input driving power. All power amplifying devices of high input impedance, such as FETs, MOSFETs, IGBTs or Darlington BJTs may be used for building the voltage regulator with very low standby power, as required by the phase cut dimmer as an embodiment of the present invention.

In accordance with the block diagram of FIG. 2 which shows the various components of the phase cut dimmer as an embodiment of the present invention, the dimming timer TIM is to be synchronized to the AC line through a unipolar zero detector.

In general, detecting the zero crossing points of AC supply is required in many circuit applications, normally when the operation of a circuit is required to be synchronized to the AC cycles, in such as phase cut dimming, AC motor control, low EMI power switching, and Power-Line Communication (PLC). Various techniques and circuit designs for zero crossing detection are known in the art.

Zero crossing detection is often performed on an AC voltage which traverses between the positive and negative polarities. However there is also the situation when AC voltage is not accessible to circuits requiring AC synchronization, such as the present case for phase cut dimmer by an AC switch, as depicted by the block diagram of FIG. 2. It can be easily visualized from FIG. 2 that by the action of rectification of the two intrinsic diodes D1 and D2, only positive pulsating DC voltage is presented to the dimmer control circuit, namely the DC power supply DCP, the unipolar zero detector UZD and the protection module PRO, as well as the MOSFETs. It is therefore only feasible to detect the zero crossing through monitoring the pulsating unipolar voltage, presented as Vrect in the circuit diagram of FIG. 5A. As shown in the diagram, the dimmer timer TIM is required to be synchronized to the AC cycles by the zero crossing signal derived from Vrect. Vrect is compared by the comparator COMP to a predetermined reference voltage Vref, say 3V, which is small compared to the peak of Vrect, say 300V allowing voltage drops along the supply line on filters, switches, rectifiers etc. from a 220V RMS AC supply source. When the instantaneous value of Vrect goes low to a point lower than Vref, i.e. near to the zero level at the end of the half AC cycle, the output of the comparator COMP changes state abruptly from low to high, the signal edge of which triggers the a pulse generating module PulGen to generate a sharp pulse of the zero marker signal OPuzd, which marks the zero crossing point of the AC line. Waveforms illustrating the generation of the zero marker signal OPuzd is shown in FIG. 5B. The upper waveform is that of the AC line voltage between the supply terminals Tac and Tacr as indicated in FIG. 2, the middle one is the rectifier output voltage Vrect, while the lower one is the zero marker signal OPuzd marking the zero crossing time of the AC line voltage.

Figure 5A:
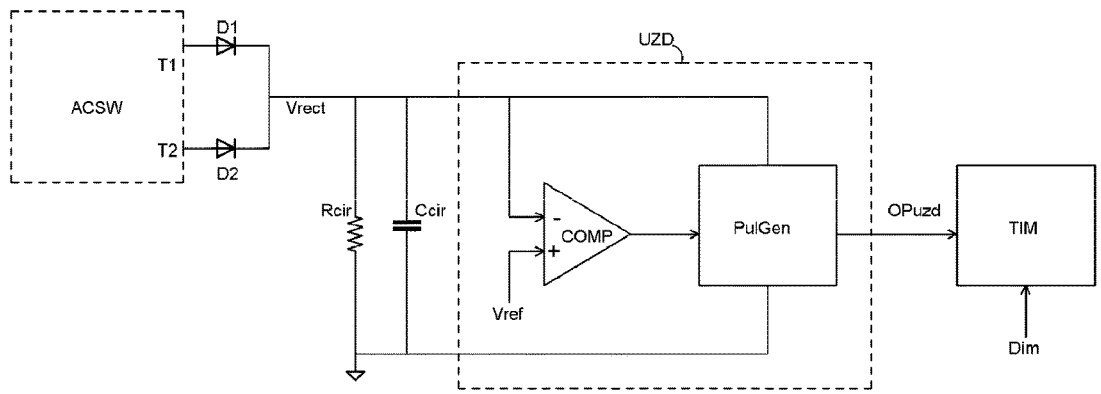
FIG. 5A is block diagram of a unipolar zero detector
Figure 5B:
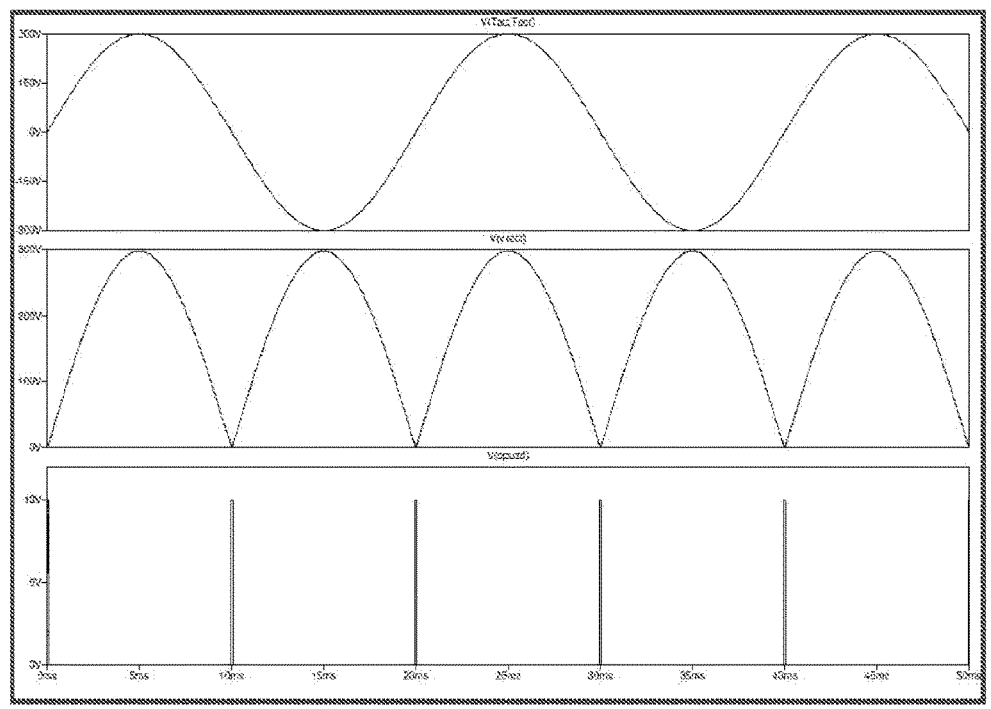
FIG. 5B shows a set of waveforms of the unipolar zero detector of FIG. 5A

However the waveforms of FIG. 5B as obtained from the circuit arrangement of FIG. 5A are only possible under an ideal condition that the capacitance associated with the rectifier output, designated by Ccir in the diagram of FIG. 5A, is small and insignificant. Ccir can be considered the equivalent capacitance from a combination of various sources: stray capacitance between the connecting wires, the input capacitance of the control circuit, the inter-electrode capacitance of the AC switch or any other loading device of the rectifier output, or the physical capacitor which have been connected between the rectifier output and the ground. Likewise, there is equivalent resistance Rcir contributed from various sources and as seen at the rectifier output.

Figure 5C:
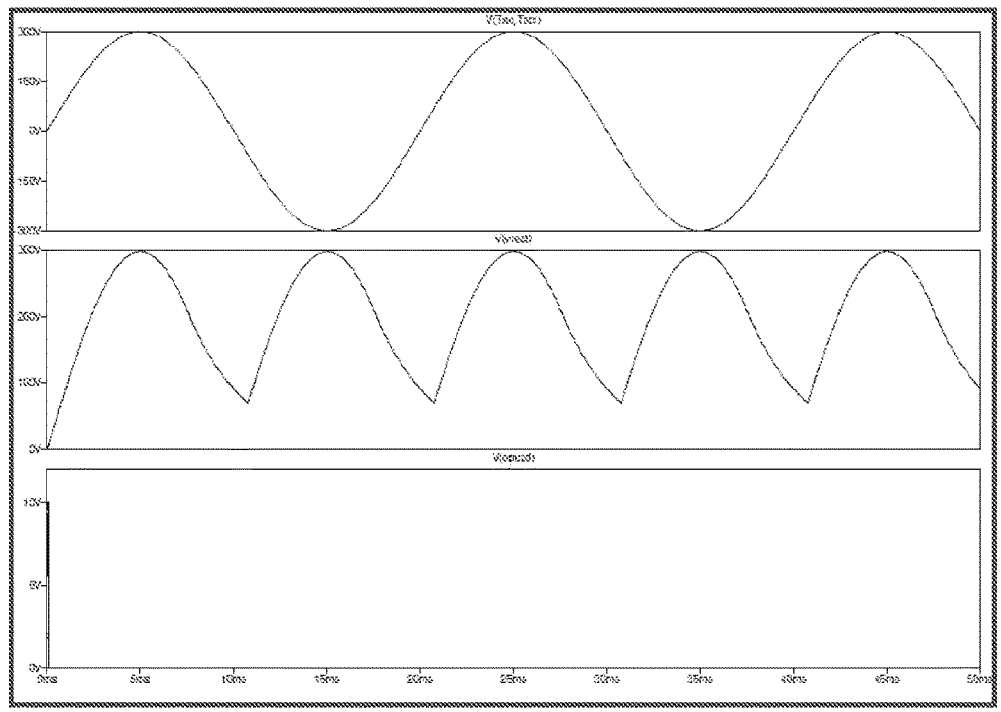
FIG. 5C is a set of waveforms of unipolar zero detector under unfavorable condition

Normal for a typical rectifying circuit, Ccir as shown in FIG. 5A will be charged up to the peak of pulsating DC voltage Vrect when the latter goes up to the peak, and then discharged through the bleeding action of the parallel resistance Rcir when supply voltage goes low in each half cycle. On the condition that the resistance Rcir is high, or for a more appropriate description, when the time constant Ccir.Rcir is substantially large compared to the half cycle period, the rectifier output voltage Vrect might not be discharged fast enough such that the voltage Vrect will never fall close to zero, so that the "zero level point" is no longer available to be detected. The scenario is illustrated by the waveforms of FIG. 5C, for a time constant Ccir.Rcir of around 3 millisecond, against a half cycle period of 10 millisecond. As shown by the middle waveform, the rectified voltage Vrect is far from falling close to the zero level and is therefore always above the reference voltage Vref. Consequently the pulse generator PulGen is never triggered and no pulse of the zero marker signal OPuzd is generated.

One simple solution to this problem is to connect in parallel with the capacitive load Ccir with an additional resistor load of sufficiently small value so that the equivalent resistance Rcir is made smaller and hence a smaller time constant Ccir.Rcir, and therefore substantial charge from the capacitor is bled by the end of each half cycle with the zero crossings "recovered". The smaller this bleeding resistor the better the result of recovery will be. However, this is not a good solution as smaller resistor means larger power dissipation which is not at all desirable.

It is clear now that to reduce the total power dissipated in recovering the zero point, the discharge action should take place as short time as possible, and just before the zero crossing point of the AC line. By discharging the capacitor Ccir near the zero point when the rectifier output voltage Vrect is at a low level, less dissipation is possible.

Figure 5D:
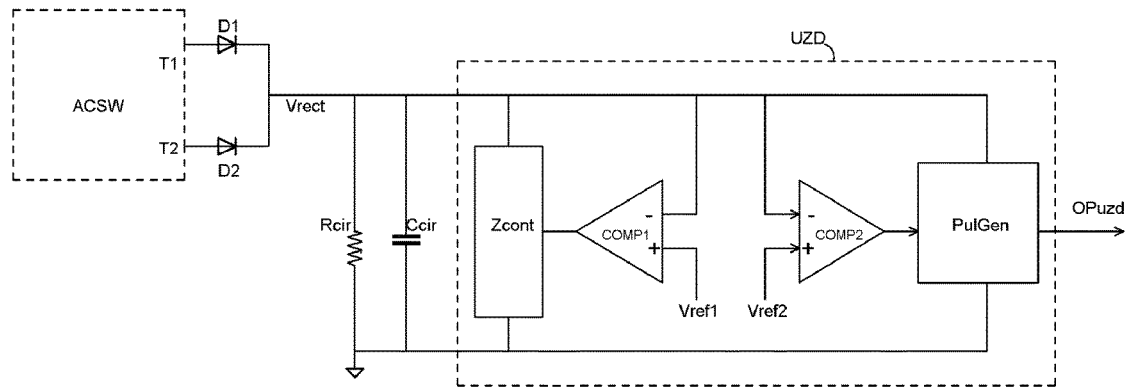
FIG. 5D shows an exemplary circuit topology for the unipolar zero detector as an embodiment of present invention
Figure 5E:
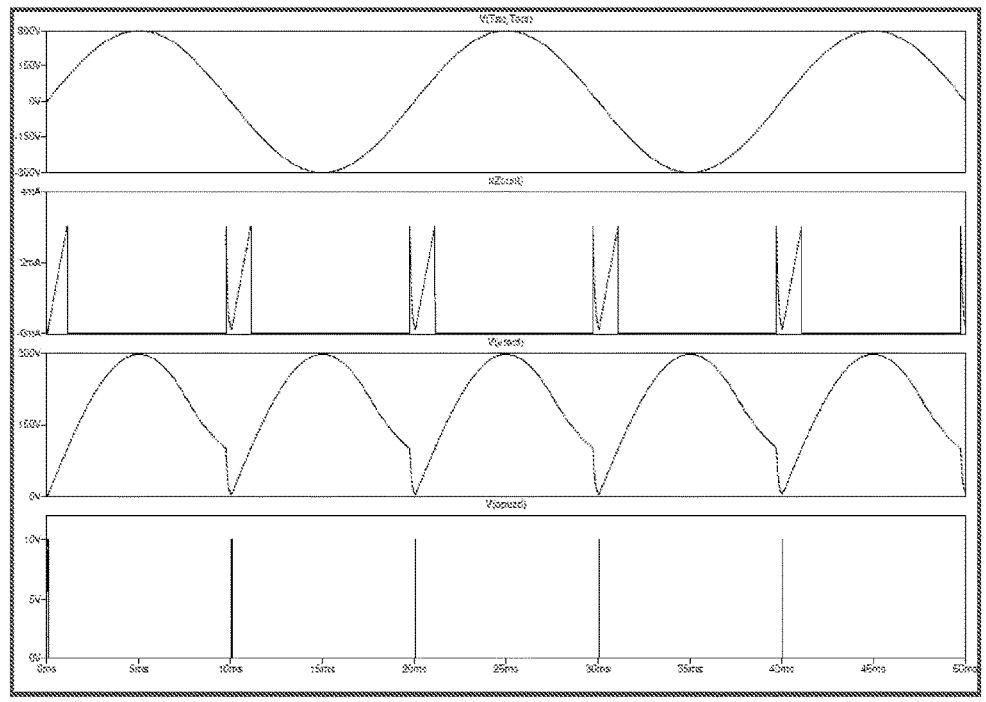
FIG. 5E shows a set of waveforms of the unipolar zero detector implemented according to FIG. 5D

With the above principle in mind, the operation principle of a unipolar zero detector as an embodiment of the present invention is proposed as shown in FIG. 5D. Compared to the prior art detector illustrated in FIG. 5A, there are two voltage comparators instead of one. By the first comparator COMP1, the rectifier output voltage Vrect is compared to a predetermined reference voltage Vref1, and the output is coupled to the controlling input of a voltage controllable non-capacitive (resistive or inductive) bleeder impedance Zcont, connected in parallel to Ccir and Rcir. In standby mode, the controllable bleeder impedance Zcont is at a high impedance. By the second comparator COMP2, the rectifier output voltage is compared to a predetermined reference voltage Vref2. By design, Vref2 is made small, say 3V, compared to the pulsating DC voltage Vrect which is say of 300V peak. Vref2 is the threshold voltage below which Vrect is considered in the zero level zone. Vref1 is made a voltage substantially larger than Vref2, say 60V, such that as long as Vrect falls below Vref1 prior to the end of the half cycle, the output of the comparator COMP1 is turned high which turns on the controllable bleeder impedance Zcont, switching it from a high impedance to a low impedance. By this, any residue charge on the capacitor Ccir will be bled quickly to ground and Vrect will fall sharply towards zero by the end of the half cycle. Consequently a sharp-edged definitive zero marker signal OPuzd is generated by PulGen once Vrect falls below the reference Vref2. The corresponding waveforms as shown in FIG. 5E illustrates further the operation principle: from top to bottom, the first waveform is the AC line voltage, the second is the bleeding current through the controllable bleeder impedance Zcont, which rises sharply before the end of the zero level zone. Consequently as shown by the third waveform the rectifier output voltage Vrect falls sharply to zero, triggering the generation of the zero marker signal OPuzd as shown by the bottom waveform.

Note that by the control of COMP1, the controllable bleeder impedance Zcont is turned on only for a very short period of time when Vrect is below say 60V, i.e. only for a period of $2 \times \sin^{-1}(60/300)/180 \times 10$ ms=1.28 ms for each of half cycle of 10 ms. Further Zcont is dissipating power only when Vrect is low. Therefore the overall power dissipation of the zero crossing detector is kept low.

Figure 5F:
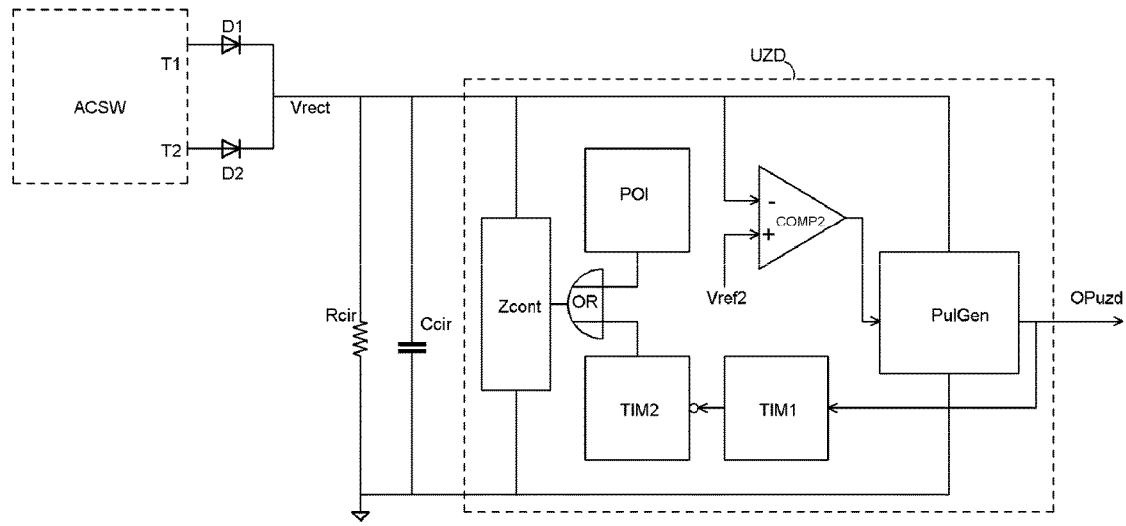
FIG. 5F shows an exemplary circuit topology for the unipolar zero detector as an embodiment of present invention

FIG. 5F shows yet another different approach for controlling the controllable bleeder impedance Zcont with very little power consumption in the unipolar zero detector as an embodiment of the present invention. As shown, a power-on initiating unit POI is deployed to turn on a low impedance of the controllable bleeder impedance Zcont via the or-gate OR. To save energy, this action is only for a short while at power up, say for a few cycles, during which unipolar zero detection sequence is started. From the output of comparator COMP2, the rising edge of which triggers the start of timing by a timer TIM1 implemented by, say a monostable multivibrator. After a predetermined period of time set by the design of the timer, say nine tenths of a half cycle, the timer is reset to give a falling signal level the edge of which triggers a second timer TIM2, say another monostable multivibrator. The output of the timer TIM2 is on for a predetermined short period of time set by the design of the timer, say two tenths of a half cycle. This short period of time is therefore set around plus and minus one tenth of a half cycle around the unipolar zero point, during which low impedance of the controllable bleeder impedance Zcont is turned on by the driving signal from the timer TIM2 to the controllable bleeder impedance Zcont through the or-gate OR. Thus the stray charge at terminals T1 and T2 of the AC switch is bled off rapidly prior to every one of the zero-level points, enabling accurate detection of the unipolar zero.

In some embodiments of the present invention, a microcontroller is deployed to implement the functions performed by the timers TIM1 and TIM2. CMOS gates and/or microcontrollers are recommended for their very low power consumption.

Figure 5G:
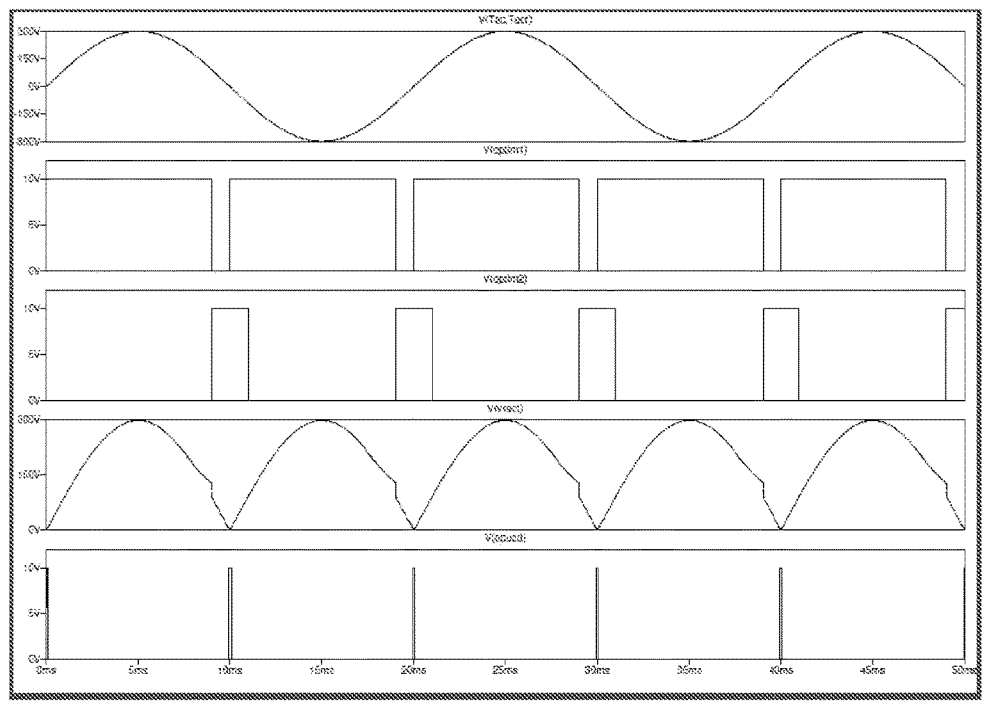
FIG. 5G shows a set of waveforms of the unipolar zero detector implemented according to FIG. 5F

The corresponding waveforms as shown in FIG. 5G illustrates the operation principle of the unipolar zero detector UZD of FIG. 5F: from top to bottom, the first waveform is the AC line voltage, the second is the output from timer TIM1, the third the output from the timer TIM2, which turns on a low impedance of the controllable bleeder impedance Zcont via the or-gate OR, bleeding the capacitor Ccir resulting quick fall of the rectifier output voltage Vrect as shown by the fourth waveform, which falls sharply towards the zero level, triggering the generation of the zero marker signal OPuzd as represented by the bottom waveform.

Figure 5H:
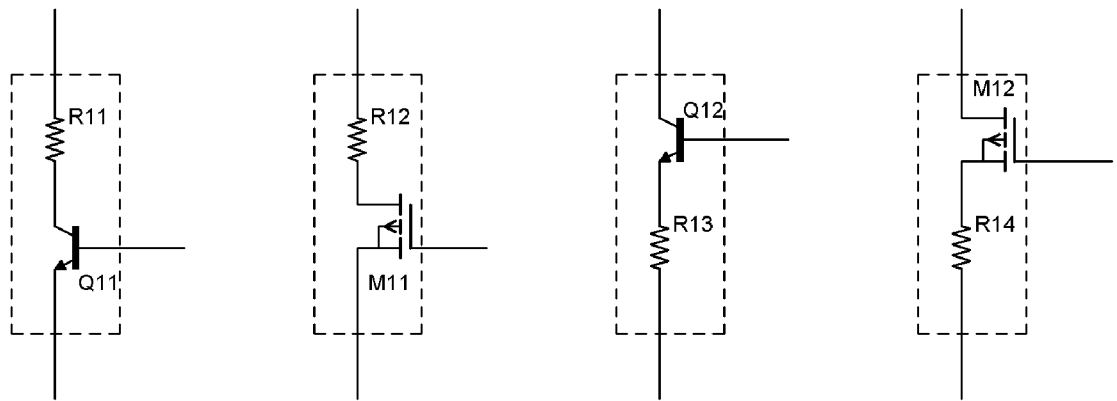
FIG. 5H shows exemplary circuit topologies for controllable bleeder impedance

The voltage controllable bleeder impedance Zcont can be implemented by those skilful in the art in many different ways. FIG. 5H shows some of the ways possible.

Figure 5I:
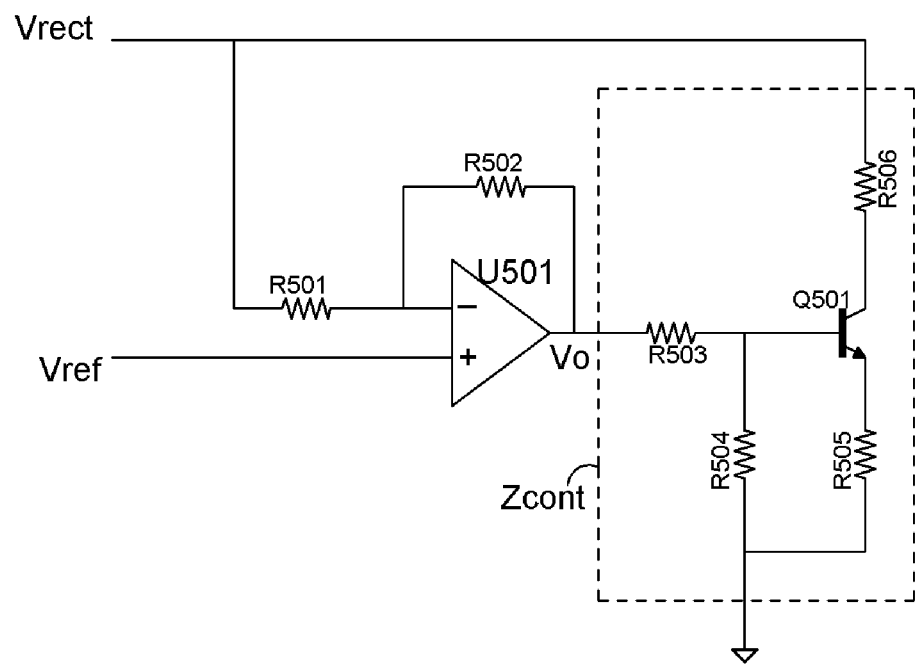
FIG. 5I shows a circuit topology for implementing a controllable impedance as an embodiment of the present invention

For circuit simplicity there is yet another different approach for controlling the controllable bleeder impedance Zcont with very low power consumption in the unipolar zero detector as an embodiment of the present invention. Referring to FIG. 5I, the impedance Zcont is consisted of a bipolar transistor Q501 and the associated resistors, and is driven by the output voltage Vo from the operational amplifier U501, in response to the pulsating rectifier output voltage Vrect. The circuit may be deployed to replace the part consisting of Zcont and COMP1 in the unipolar zero detector UZD shown in FIG. 5D.

As shown in the circuit diagram of FIG. 5I, Vref is a fixed reference voltage coupled to the positive input of the operational amplifier U501. The rectifier output voltage Vrect is coupled to the negative input of U501, via resistor R501. A negative feedback resistor R502 is connected between the negative input and output of U501.

By the working principle of the operation amplifier, we have $$Vo = Vref*(R501+R502)/R501 - Vrect*R502/R501 \quad (1)$$

By design, let us set Vo=0 when Vrect reaches its peak voltage, Vrectp, so that Q501 is completely turned off at the peak of Vrect, i.e. $0 = Vref*(R501+R502)/R501 - Vrectp*R502/R501$ leading to $Vref = Vrectp*R502/(R501+R502) \quad (2)$ Hence by equation (1)

$$Vo = Vrectp*R502/(R501+R502)*(R501+R502)/R501 - Vrect*R502/R501 \quad (3)$$

$$= R502/R501*(Vrectp - Vrect)$$

For a fixed Vref, say 10V, and a peak voltage Vrectp of 300V, we have by equation (2)

$10 = 300*R502/(R501+R502)$, giving $$R501/R502 = 29 \quad (4)$$

Hence by equation (3)

$$Vo = (Vrectp - Vrect)/29 \quad (5)$$

In other words by the above design the output of the operational amplifier U501 is zero at the peak of Vrect, rises up linearly with decreasing Vrect until Vrect reaches zero when Vo reaches the maximum of 300/29=10.345V.

By driving the controllable bleeder impedance Zcont with output Vo from the operational amplifier U501, the impedance of Zcont is adjusted instantaneously with the voltage of Vrect, from open circuit when Vrect is at the peak, linearly down with decreasing Vrect, to the lowest value as Vrect approaches the zero level. In other words, the value of Zcont is made proportional to the instantaneous value of the pulsating DC voltage Vrect. Consequently charge on the capacitor Ccir is bled continuously and more and more forcefully when getting closer to the zero level of Vrect, thus enabling clear detection of unipolar zero.

As illustrated by the circuit diagram of FIG. 5I, the controllable bleeder impedance Zcont is implemented by an NPN bipolar transistor. However other types of amplifying devices may also deployed, such as PNP transistors, MOSFETs, IGBTs, etc., with suitable circuit adjustments.

Figure 5J:
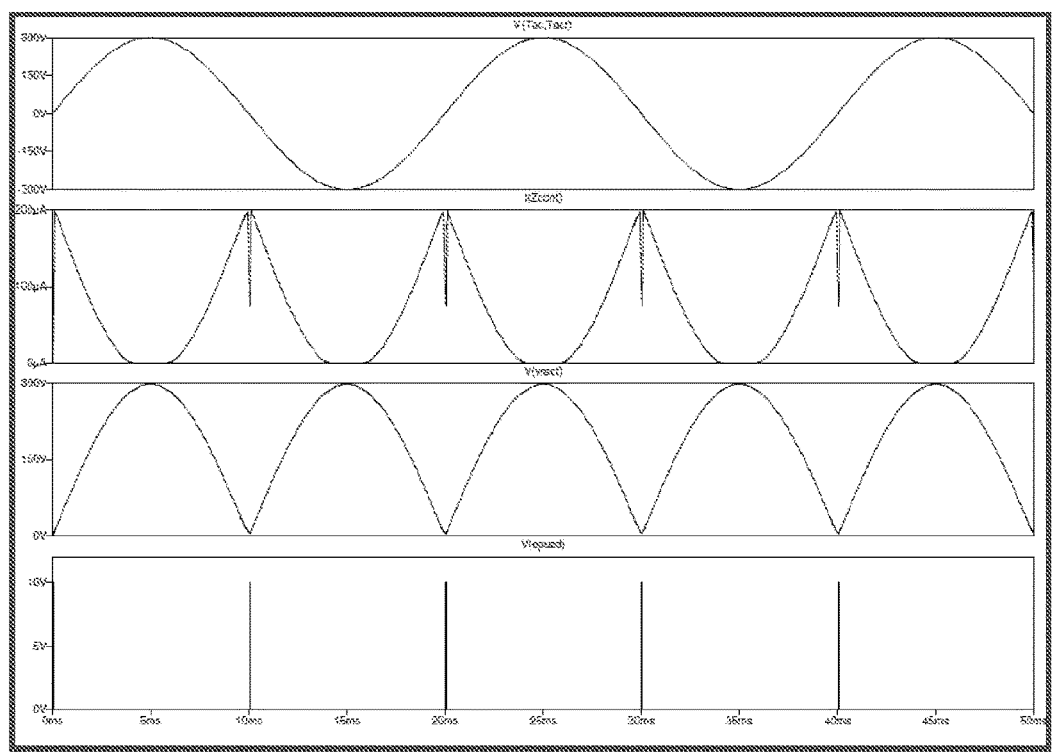
FIG. 5J is a set of waveforms of the unipolar zero detector implemented with the controllable bleeder impedance of FIG. 5I

The performance of the unipolar zero detector as shown in FIG. 5D employing the controllable bleeder impedance Zcont as shown in FIG. 5I may be illustrated by the waveforms of FIG. 5J. From top to bottom, the first waveform is the supply AC voltage, second is the bleeding current through the controllable bleeder impedance Zcont, the third is the rectifier output Vrect, while the bottom is the generated zero marker signal OPuzd from the unipolar zero detector UZD.

Figure 5K:
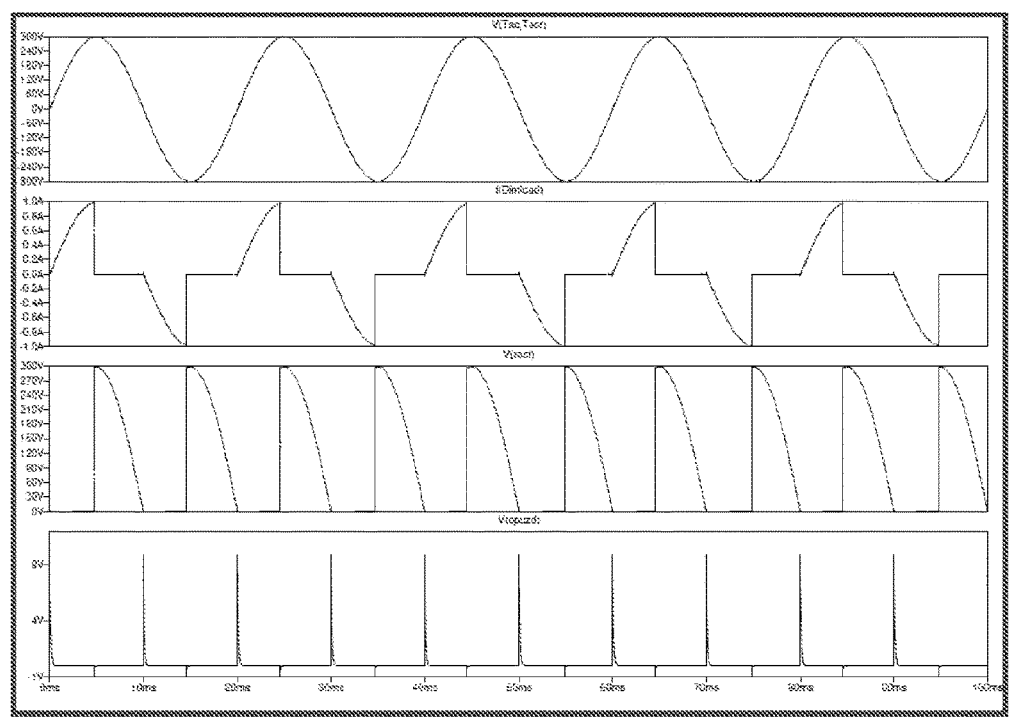
FIG. 5K is a set of waveforms showing the synchronized operation of a trailing edge dimmer

In the above discussion, full wave rectification without dimming is deployed to illustrate the performance of the unipolar zero detectors as various embodiments of present invention. In actual operation of the dimmers, the waveforms are phase cut and zero level detection takes a different look as illustrated by FIG. 5K. Shown are the waveforms of a trailing edge dimmer operating in synchronization to the AC cycles, dimming at around 50%. From top to bottom, the first waveform is that of the AC line voltage ACV, the second is the chopped waveform of the load current DimLOAD, the third is the rectifier output voltage Vrect, while the bottom is the zero marker signal OPuzd from the unipolar zero detector. Note that the unipolar zero detection point is at the transition of the voltage Vrect from high to zero level, and the zero level persists for a period corresponding to the on time of the dimmer.

Figure 6A:
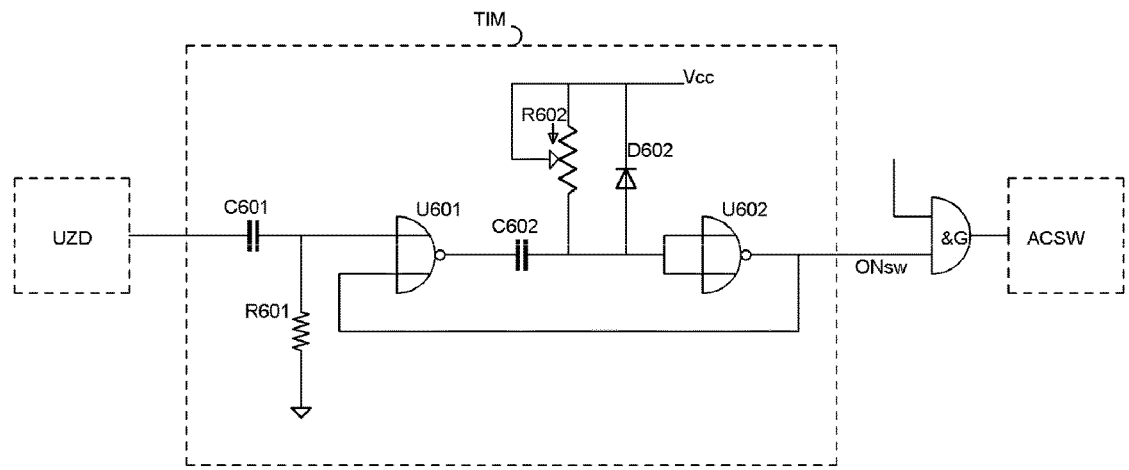
FIG. 6A shows a circuit of monostable multivibrator as a prior art dimming time controller

As shown by FIG. 2, the output of the unipolar zero detector will trigger the dimming time controller TIM. TIM is essentially a typical edge-triggered monostable multivibrator, such as the one shown in FIG. 6A, implemented with two CMOS NOR gates U601 and U602. The controller is triggered by the positive "edge" of the zero marker signal from the unipolar zero detector UZD, extracted by a differentiating circuit composed of the capacitor C601 and resistor R601.

At steady state, the output signal ONsw from the gate U602 is low because its gate input is biased high by the variable resistor R602. Whenever the positive going zero marker signal appears at the input, it will turn the output of gate U601 low, turning the output of gate U602, signal ONsw, high through the coupling capacitor C602. Signal ONsw is also coupled to the one input of gate U601, maintaining its low output state. Consequently the capacitor C602 is charged up by the DC power supply Vcc through the variable resistor R602 until the voltage across it is high enough to turn the output of gate U602 low, ending the monostable pulse period. With the output of U601 high, the capacitor C602 will discharge through the diode D602 into the DC power supply Vcc quickly to get the circuit reset ready for the next zero marker signal. Thus, at each unipolar zero at the end of each and every power line half cycle, the monostable output ONsw is turned high for a period of time determined by the product of values of the capacitor C602 and the variable resistor R602. The longer the high period of ONsw, the smaller is the dimming level. Therefore, for a fixed capacitor C602, the dimming is controlled by variation of the resistor R602.

At low operating frequency, CMOS gates usually consume little power in digital switching, drawing a supply current in microamperes. However for a monostable multivibrator, it is noted that during the period when C602 is charged up, the input to the NOR gate U602 goes through and stay in the linear operation region for a substantial period of time during which power consumption could be exceptionally high, drawing a supply current in milli-amperes. Therefore this does not meet the requirement of low power consumption for the dimming time controller as an embodiment of present invention.

Figure 6B:
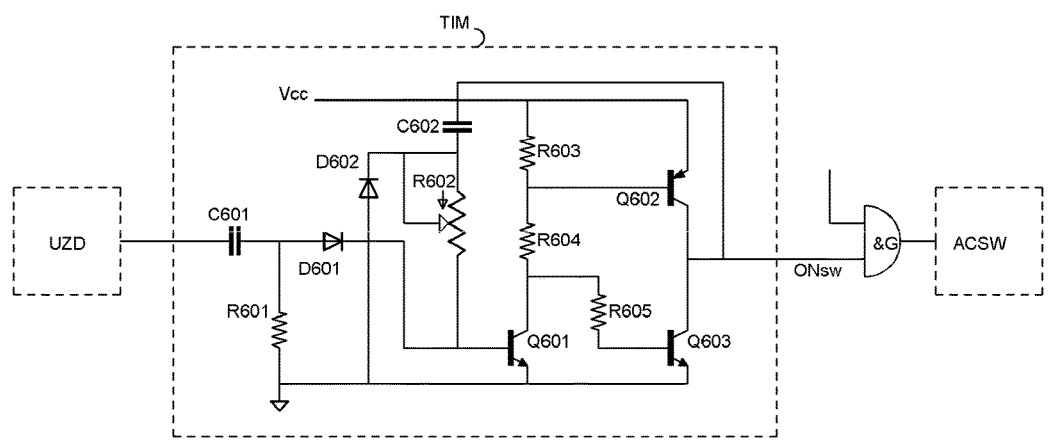
FIG. 6B shows the circuit of a low power monostable multivibrator as an embodiment of the present invention

FIG. 6B shows an implementation circuit of a edge-triggered monostable multivibrator, deployed as the dimming time controller TIM as an embodiment of the present invention. Referring to the circuit diagram, transistor Q601 is configured as an inverter, followed by another inverter composed of the transistors Q602 and Q603. The two inverters are connected in cascade, providing the necessary loop gain for normal operation of the monostable multivibrator. In the standby (unexcited) state, transistor Q601 and Q602 are biased off by design, while Q603 is conducting with the base biasing current passing from the DC power supply Vcc through the resistors R603, R604 and R605. The values of these three resistors are chosen so that the two output transistors Q602 and Q603 will never conduct simultaneously. The output level ONsw is therefore low and the AC switch is off. At the unipolar zero, a positive pulse from the unipolar zero detector UZD drives the transistor Q601 on momentarily, turn off transistor Q603 and turning on transistor Q602. The output ONsw is pushed to a high level close to Vcc. This high output level also starts a charging process of the capacitor C602 via the variable resistor R602 and the base-emitter of transistor Q601. As long as charging continues, transistor Q601 is kept on, so is transistor Q602. The high state of ONsw will continue for a while until the C602 is fully charged, when the charging current falls down to a small value that the transistor Q601 is turned off again, cutting off transistor Q602 and turning on the transistor Q603. As Q603 is turned on, the output ONsw falls low, discharging the capacitor C602 through the diode D602 rapidly due to the low impedance of the diode in the forward current flow direction, and the circuit is back to the standby state ready for the next pulse of zero level. The length of high period of ONsw is therefore dependent on the product of the values of capacitor C602 and variable resistor R602. The longer the high period of ONsw, the smaller the dimming level will be. Therefore, for a fixed capacitor C602, the dimming is controlled by variation of the resistor R602.

Note that when in the standby state, the only current flowing is that through the biasing resistors R603, R604 and R605. To reduce the total power requirement from the DC power supply Vcc, these resistors are to be made as high as possible, together with transistors of high current gains and low leakage, including the use of Field Effect Transistors (FETs). When in the excited mode that the monostable output ONsw is high, current is also drawn from Vcc to charge the capacitor C602 through the transistor Q602. Therefore to reduce the amount of current for lower power consumption, the value of capacitor C602 should be as small as feasible, with the value of R602 adjusted accordingly.

Hence the monostable circuit of dimming time controller as illustrated by FIG. 6B offers a solution for very low power consumption in meeting the requirements of the phase cut dimmer as the embodiment of present invention.

Figure 7A:
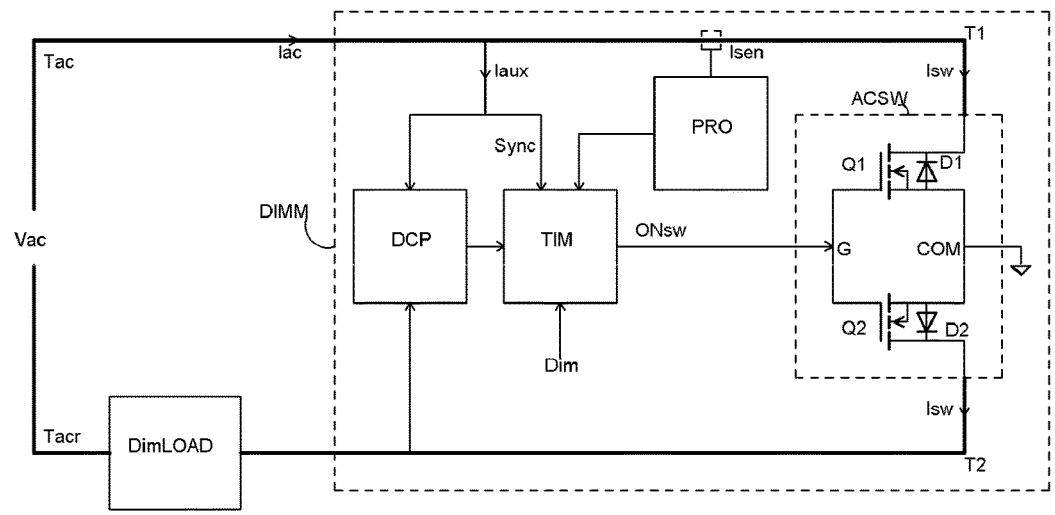
FIG. 7A shows a prior art scheme of over-current protection

FIG. 7A depicts the operation of a phase cut dimmer as prior art, utilizing MOSFETs Q1 and Q2 connected anti-series as an AC switch.

The circuit protection module PRO is deployed to protect the system (the AC power supply, the load and the dimmer itself) by switching the AC switch off via the dimming timer module TIM as and when the sensed switch current Isw is above a predetermined safety limit. As shown, current Isw is sensed by a current sensor Isen. In a traditional design, the current sensor could be a power resistor, the voltage drop of which indicates the current passing through. However this approach has two possible drawbacks, namely the power dissipation of the power resistor, and/or complexity of the amplifier circuit to amplify the small voltage drop. Alternatively, a current transformer may be deployed, but at a much higher cost. In any case, the traditional approach is likely costly and power consuming, and is not practically feasible to be deployed in a phase cut dimmer.

Figure 7B:
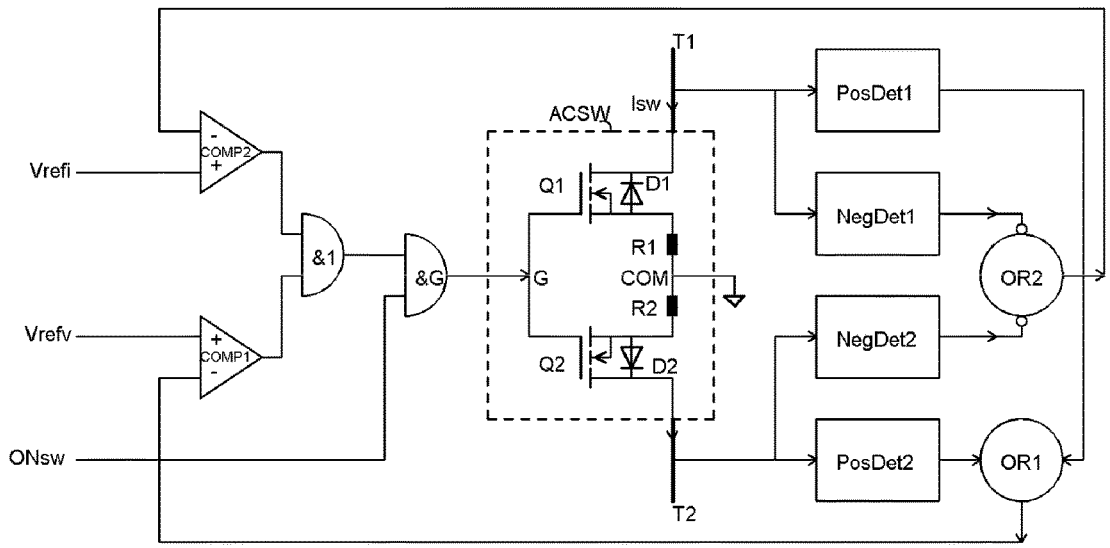
FIG. 7B is a block diagram showing the operation principle for over-current and over-temperature protection as an embodiment of present invention

FIG. 7B is a block diagram of a circuit topology for over-current and over-temperature protection as an embodiment of the present invention, as depicted in FIG. 2. The combined drain voltages, positive and negative, are separated and monitored simultaneously for over-current and over-temperature conditions respectively. Shown also the source electrodes are the two resistors R1 and R2, which are optional for increasing the sensitivity of current sensing. However, R1 and R2 are to be assumed zero just to simplify the discussion following.

When the gate voltage at terminal G with respect to the common point COM of the source electrodes of the two MOSFETs is below the threshold, both MOSFETs Q1 and Q2 are switched off. The two intrinsic diodes D1 and D2 are also in anti-series connection, and are therefore not conducting. Therefore the AC switch formed of the MOSFETs is in effect switched off.

When the gate voltage with respect to the common point COM of the source electrodes of the two MOSFETs is sufficiently high, both Q1 and Q2 are switched on. The path of current flow will depend on the polarity of the AC supply voltage. When the supply voltage is positive, i.e. the voltage at T1 is higher than T2, the diode D1 will be reverse bias and diode D2 is forward biased. Current Isw therefore flows through T1, Q1, D2 and then T2. On the other hand, when the supply voltage is negative, i.e. the voltage at T1 is lower than T2, the diode D2 will be reverse bias while diode D1 is forward biased. Current Isw therefore flows through T2, Q2, D1 and then T1.

It is observed that whenever current is passing through the AC switch, current is passing through either one of the two diodes D1 or D2, dependent on direction of current flow. Further with respect to the common point COM of the source electrodes of the two MOSFETs, a negative voltage drop is established over the conducting diode D1 or D2, the magnitude of which dependent on the volt-amp characteristics of the diodes. In other words, by monitoring the negative voltage over the diodes, the current over the AC switch is monitored.

It is also observed that whenever current is passing through the conducting MOSFET, a positive voltage is established over the drain with respect to the common point COM of the source electrodes of the two MOSFETs, due to the voltage drop on the source-drain on-resistance. It is well known that the source-drain on-resistance of a MOSFET has a positive temperature coefficient, for which the on-resistance will approximately double for a rise of channel temperature from 25 to 100 Degree Celsius. Therefore, given a known amount of current passing through the MOSFET, the channel temperature of a MOSFET can be monitored by monitoring the drain voltage of the device. It may be viewed that bundled with over-temperature protection there is also the over-current protection despite the fact that the current threshold in this case is highly dependent on the channel temperature.

As shown in FIG. 7B, the gates of the two MOSFETs Q1 and Q2 are coupled together to the output of an AND gate &1. Assuming a standby condition that outputs from the two comparators COMP1 and COMP2 are both high, a high level of signal SWON turns both MOSFETs Q1 and Q2, and hence the AC switch, on.

For detecting the current through the AC switch, a negative voltage detector circuit, NegDet1, is coupled to the drain of MOSFET Q1. The function of the detector is to sample the negative voltage on the drain electrode of Q1, but ignoring the positive voltage. A separate but identical circuit, NegDet2, is coupled to the drain electrode of MOSFET Q2 for the same purpose, i.e. to sample the negative voltage on the drain electrode of Q2, but ignoring the positive voltage. The output of each detector is polarity inverted to a positive signal before coupled to the voltage comparator COMP2 through the analog-OR gate OR2. The voltage level of the positive signal, representative of the current passing through the AC switch, is compared to a predetermined reference voltage Vrefi. Vrefi is set to a value corresponding to the over-current set point of the AC switch, so that once the output of OR2 is higher than Vrefi, output of COMP2 turns low, turning the output of the AND gate &1 low such that the MOSFETs are turned off immediately.

With the AC switch is turned off, voltage over the drain electrode of one of the MOSFETs will rise up and be detected by a corresponding positive voltage detector PosDet1 or PosDet2. The detectors also scale down the magnitude of the drain voltage, which can be as high as the peak of the supply voltage. The output from the detectors, representative of the voltage at the drain electrodes of the MOSFETs, is coupled to the voltage comparator COMP1 through the analog-OR gate OR1, and compared to a predetermined reference voltage Vrefv. The choice of the value of Vrefv is to be explained in the following discussion, but is nevertheless small compared to the open drain voltage of the MOSFETs. Consequently the output of COMP1 turns low thus turning the output of the AND gate &1 low such that the MOSFETs are kept turned off even if the output of comparator COMP2 returns to high state as current flow through the AC switch has dropped to zero. The AC switch will be kept in off state until the AC voltage goes down to near the zero voltage level by the end of the half-cycle.

As explained earlier, the channel temperature of a MOSFET can be monitored by monitoring the drain voltage of the device when passing a known amount of current. By setting the value of Vrefv for the comparator COMP1 to the expected drain voltage corresponding to the high temperature limit, the output of the comparator COMP1 will turn low as soon as the temperature limit is reached, thus turning the output of the AND-gate &1 low such that the MOSFETs are turned off immediately.

Figure 7C:
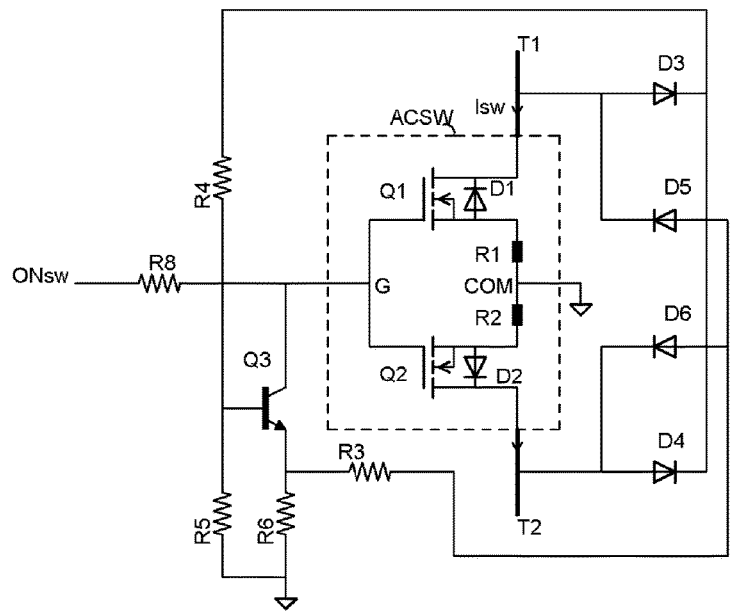
FIG. 7C shows circuit topology of the over-current and over-temperature protection as an embodiment of present invention

FIG. 7C shows a circuit scheme for implementation of both the over-current and over-temperature protection functions as depicted in FIG. 7B for the phase cut dimmer as an embodiment of present invention. Diodes D5 and D6 play the role of negative voltage detectors in NegDet1 and NegDet2 respectively, while diodes D3 and D4 play the role of the positive voltage detectors PosDet1 and PosDet2 respectively. By rectification action of diodes D5 and D6, only negative portions of the drain voltage of MOSFETs Q1 and Q2 appear at the connected cathodes of the diodes D5 and D6 as a combined negative drain voltage. Likewise, by rectification action of diodes D3 and D4, only positive portions of the drain voltage of MOSFETs Q1 and Q2 appear at the connected anodes of the diodes D3 and D4 as combined positive drain voltage.

Note that each of the detector diodes D3, D4, D5 and D6 does need a minimum threshold voltage for conduction, thus reducing somewhat the detection sensitivity. If required however more accurate detection circuits could be employed. Those skilful in the art will be able to design with operational amplifiers rectifying circuits of the highest precision.

The functions of the comparators COMP1 and COMP2 as in FIG. 7B are taken up by the transistor Q3 alone. The base-emitter voltage of Q1 is taken as the reference voltage for both voltage comparison functions. The negative drain voltage as detected by D5 and D6 is coupled to the emitter of transistor Q3 via the resistor R3, while the positive drain voltage as detected by D3 and D4 is coupled to the base of transistor Q3 via the resistor R4. A resistor R6 is connected between the emitter of transistor Q3 and the circuit common COM, such that through the ratio of R3 to R6, the negative drain voltage input to the comparator can be adjusted. Likewise, A resistor R5 is connected between the base of transistor Q3 and the circuit common COM, such that through the ratio of R4 to R5, the positive drain voltage input to the comparator can be adjusted. The choice of the resistors is a matter of design, and is considered in combination with the electrical characteristics of the transistors Q1, Q2 and Q3.

The output of the comparators are in effect logically "ANDed" at the collector of transistor Q3, and is coupled to the junction of R8 and the gates of MOSFETs Q1 and Q2. It may be conceived that the combined output from the comparators is further "ANDed" with the switch on signal ONsw, via R8. In effect, the switch on signal ONsw will be pulled down by the collector of Q3 in either one of the following conditions:

1 Whenever the emitter voltage of Q3 is pulled down low enough by the combined negative drain voltage of MOSFETs Q1 and Q2, corresponding to an over-current condition;
2 Whenever the base voltage of Q3 is raised high enough by the combined positive drain voltage of the MOSFETs Q1 and Q2 while the corresponding MOSFET Q1 or Q2 is conducting, corresponding to an over-temperature condition;
3 Whenever the AC switch is open circuit and the combined positive drain voltage is sufficiently high but no lower than that in the over-temperature condition.

As the protection circuit is built around a high impedance input circuit to the MOSFETs, the amount of power consumed is very low. The transistor Q3 is required to handle only microamperes of current through the gate resistor R8. Therefore low power consumption requirement by the dimmer as an embodiment of the present invention is met.

The foregoing description of the over-current and over-temperature protection of the phase cut dimmer with AC switch as an embodiment of the present invention can be further illustrated by the waveform diagrams of FIG. 8A, FIG. 8B, FIG. 8C and FIG. 8D. Shown in each figure are three waveforms obtained from circuit implementation according to the operation block diagram of FIG. 2 as an embodiment of present invention:

Upper waveform: The gate driving signal ONsw to the MOSFETs forming the AC switch
Middle waveform: Current passing through the load of the dimmer DimLOAD
Lower waveform: The positive drain voltages of the MOSFETs forming the AC switch The waveforms are obtained with the AC line voltage at 220V/50 Hz, dimming level set to around 50%.

Figure 8A:
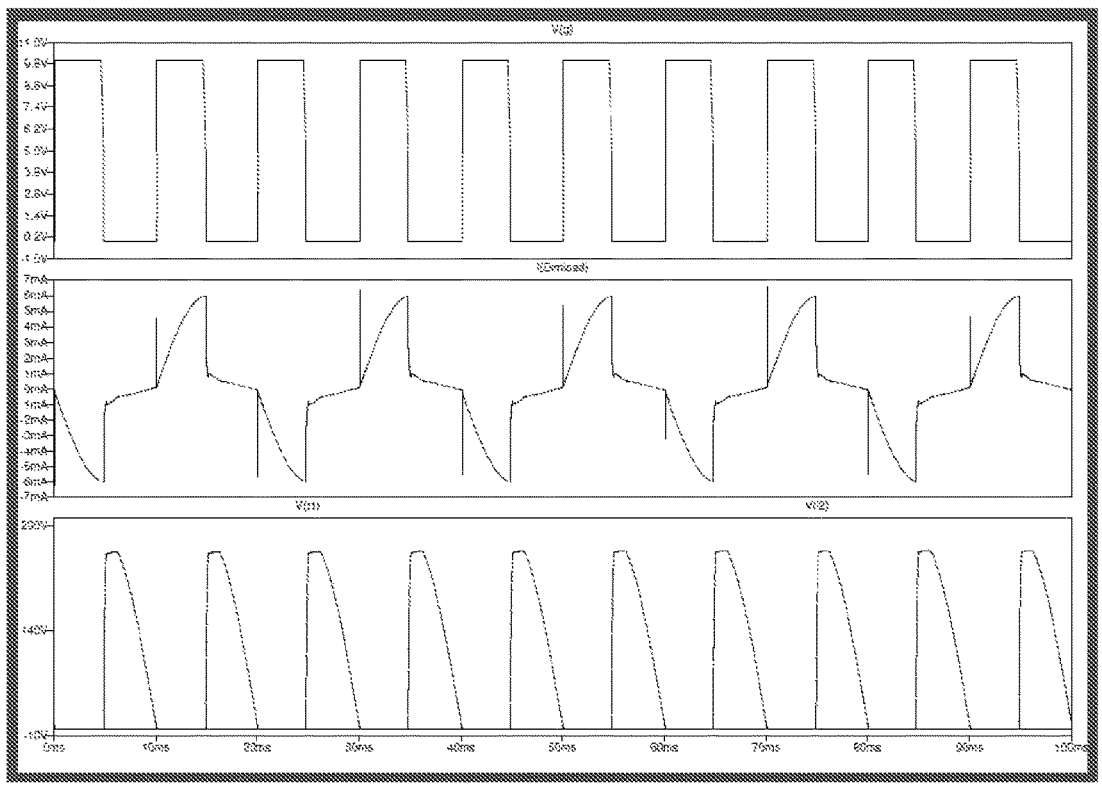
FIG. 8A, FIG. 8B, FIG. 8C and FIG. 8D are collections of waveforms illustrating the operation as well as the over-current and over-temperature protection of the phase cut dimmer as an embodiment of the present invention

The waveforms of FIG. 8A are obtained with a small load of 50 kohm (i.e. 1 W at full load). Note the non-zero load current at the off time of the AC switch when the gate driving signal to MOSFETs is low, due to the uncontrolled currents Ifil through the low pass filter FIL and Iaux required to power the dimmer control and protection circuits. However these two currents are very low by design according to the present invention, therefore enabling dimming of a low power load feasible.

Figure 8B:
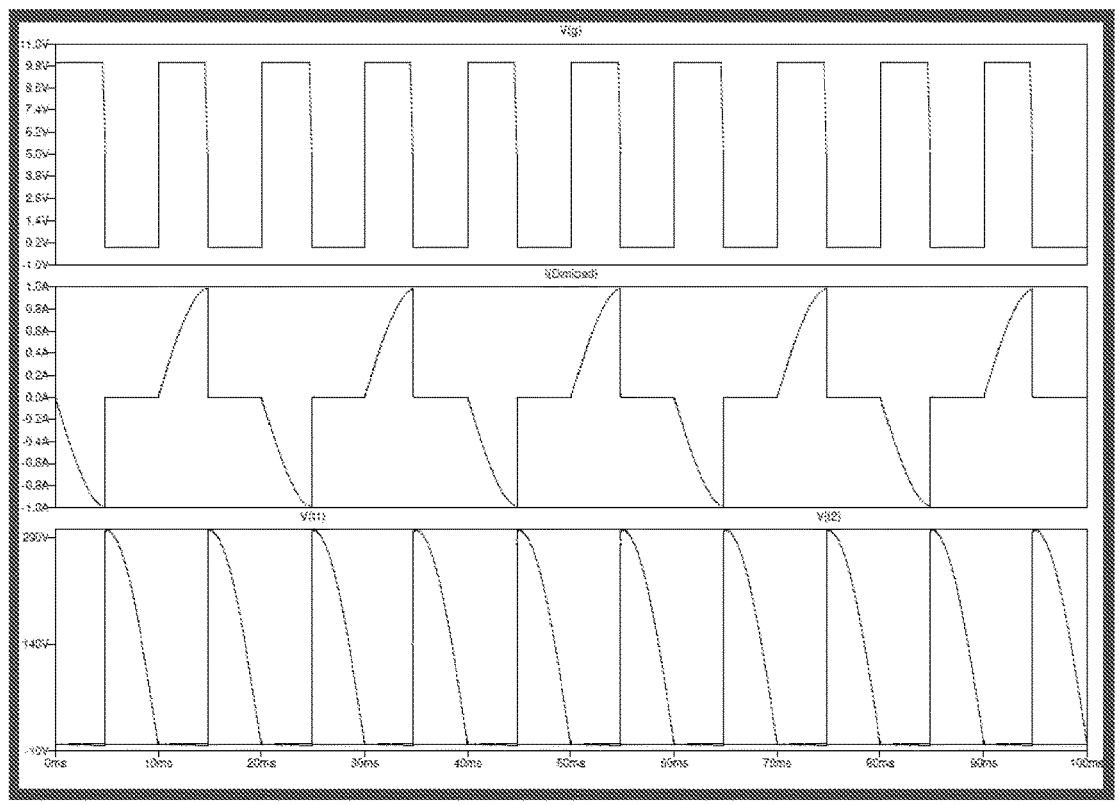

The waveforms of FIG. 8B are obtained with a load of 300 ohm (i.e. 161 W at full load). Over-current protection is not triggered as the peak current has not exceeded the threshold of 1 A.

Figure 8C:
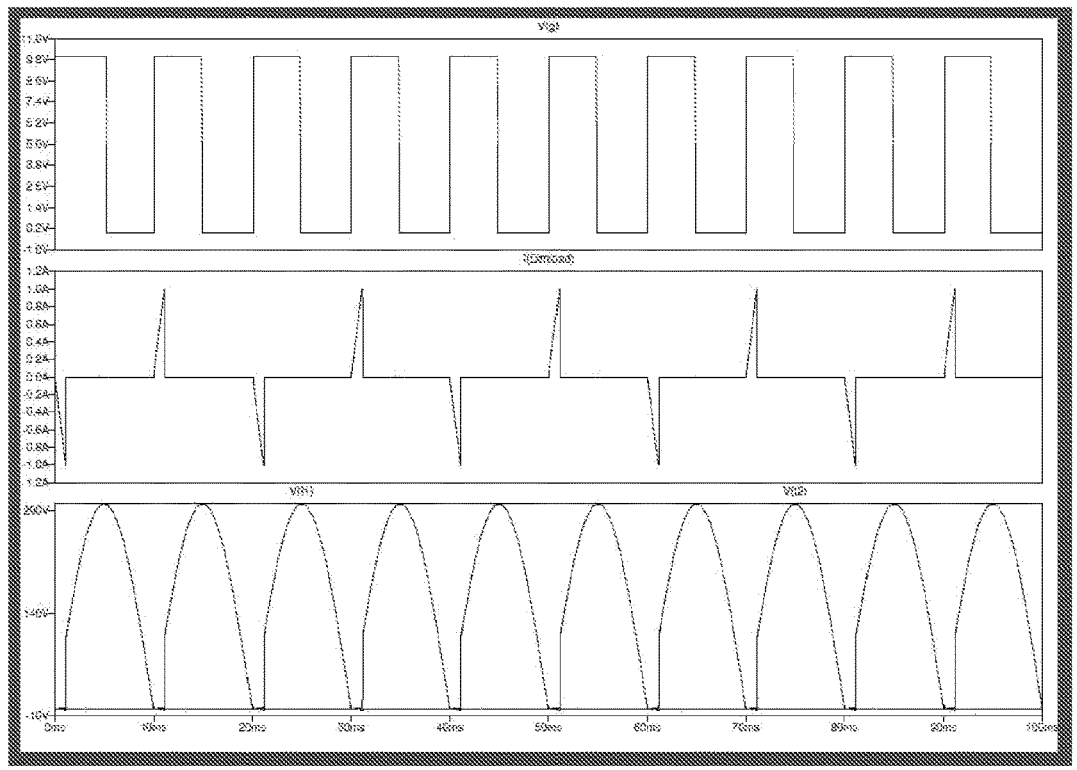

The waveforms of FIG. 8C are obtained with a load of 100 ohm (i.e. 484 W at full load). Over-current protection is triggered and the peak current is limited to 1 A peak, half-cycle by half-cycle. Note that at the moments the protection action has taken place the load current is cut to zero even the gate driving signal ONsw is still high.

Figure 8D:
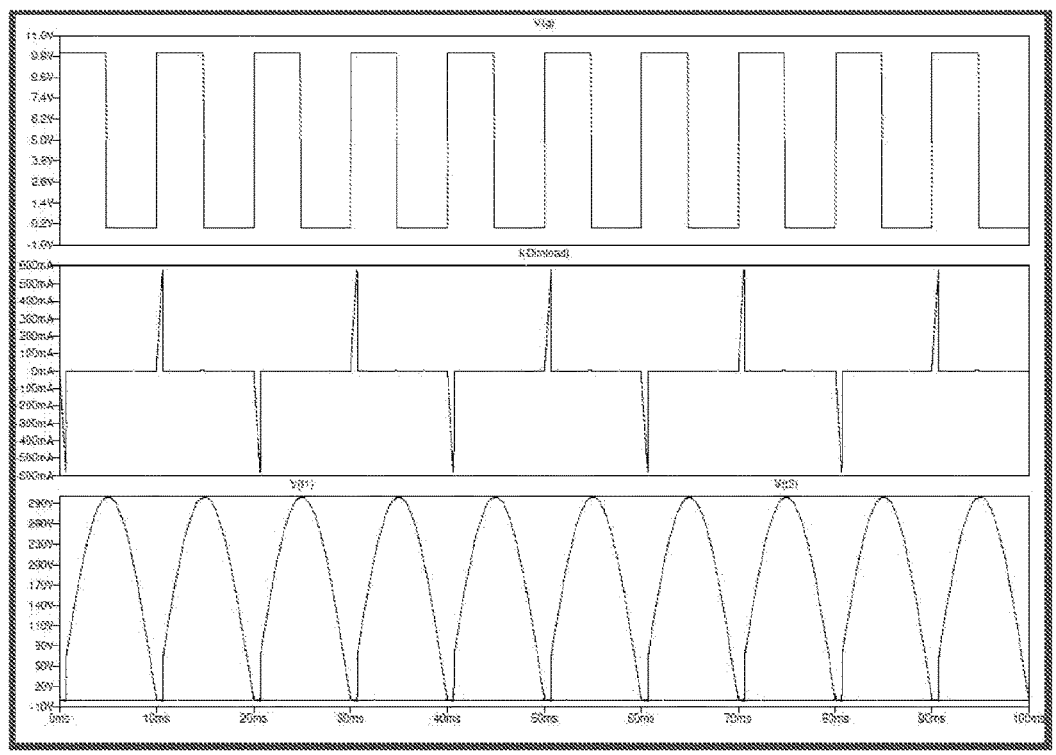

The waveforms shown in FIG. 8D is obtained with a load of 300 ohm again, but with an increase of channel resistance of the MOSFETs to a more than double value through raising the channel temperature. As shown the protection action is triggered when the load current reaches around 600 mA only, well before the triggering level of 1 A for the over-current protection action when the channel temperature is normal.

Note that the above discussion is for protection of the AC switch employed generally for switching AC current. The same principle of protection is also applicable to DC switch for DC current switching, when one of the two MOSFETs, say Q2 is no longer required and thus be removed. As such, the above condition (1) is no longer valid as there will not be any negative voltage. However both conditions (2) and (3) will still be valid, and that by monitoring the positive drain voltage of Q1, over-temperature and over-current conditions can be detected and the system is protected accordingly, as illustrated by the circuit of FIG. 9.

Figure 9:
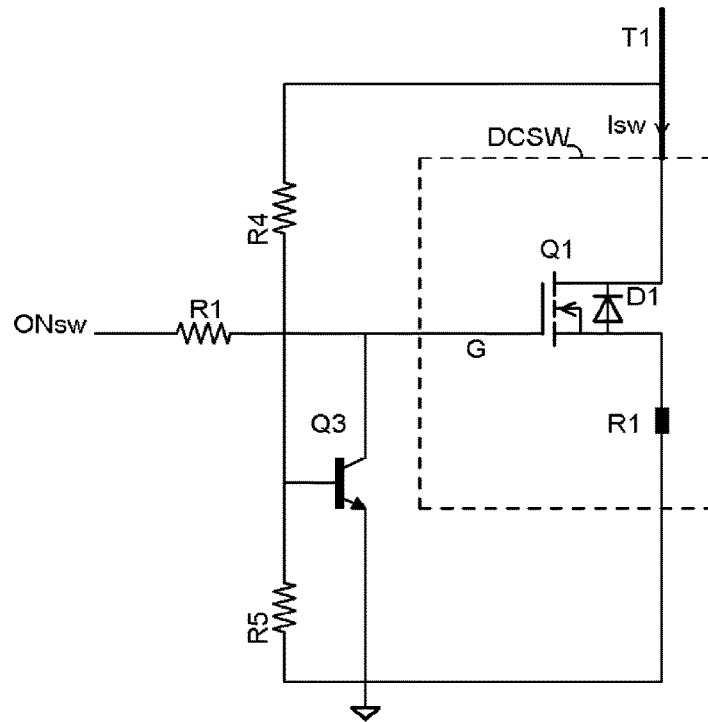
FIG. 9 shows circuit topology of the over-current and over-temperature protection for dimming by DC switch, as an embodiment of present invention

As shown, FIG. 9 has been obtained by simplifying FIG. 7C, with D3, D4, D5, D6, R2, R3, R6 and Q2 (including D2) removed, and the AC switch ACSW becomes DC switch DCSW. At a certain level of current passing through MOSFET Q1 and in the event of over-temperature of Q1, the drain voltage will have sufficient magnitude to turn on Q3 through resistor R4. This will in turn pull down the gate voltage of the MOSFET Q1 and turn off Q1. As Q1 is turned off, the drain voltage will rise which will further keep Q3 on and thus Q1 will be locked off until the end of the half cycle when the driving voltage Vrect is zero.

It is expected that even when the channel temperature of Q1 is normal, drain voltage will still rise with raised drain current. It is therefore feasible by adjusting the relative values of the resistors R4 and R5 Q3 can be turned on at certain level of the drain current, thus providing the over-current protection function.

Figure 10:
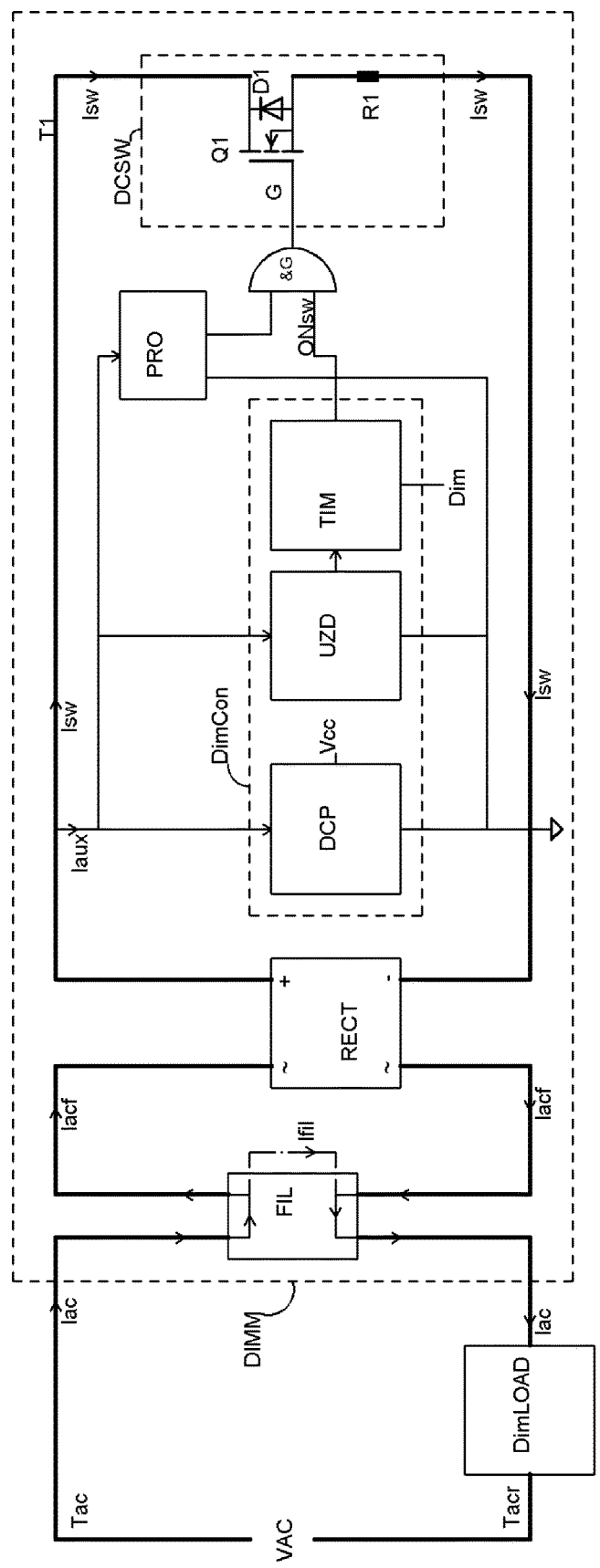
FIG. 10 is a block diagram showing the major components of a DC switching phase cut dimmer as an embodiment of the present invention

While the various embodiments of the present invention quoted are based on phase cut dimmers with AC switch as depicted by FIG. 2, the same principles and benefits are applicable also to those with DC switch, i.e. dimmers with phase cutting after full wave rectification of the AC voltage. FIG. 10 is a block diagram showing a dimmer with DC switch DCSW, i.e. switching by a single MOSFET Q1, as an alternative embodiment of the present invention. Rectification by full bridge rectifier RECT is arranged after the filter module FIL, though the relative position can be interchanged. The dimmer controller DimCon, with its three functional blocks: the DC power supply DCP, the unipolar zero detector UZD, and the dimming time controller TIM, remains the same as that for the dimmer with AC switch.

Over-current and over-temperature protection functions are also feasible with circuit adjustments as illustrated by modification of FIG. 7C to FIG. 9 as explained in the preceding section.

Although the invention and its advantages have been described in detail, it should be understood that various changes, substitutions, and alterations can be made therein without departing from the spirit and scope of the invention as described. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the invention.

The invention claimed is:

1. A phase cut dimmer, coupled between an AC power source and a load, to control the amount of power delivered from the power source to the load, comprising:
    a switch to turn on and to turn off the current from the power source to the load;
    a rectifier to convert the AC voltage from the power source to pulsating DC voltage which is coupled to the switch;
    a zero crossing detector of the AC voltage, comprising therein a bleeder with a controllable impedance coupled to the output of the rectifier; and
    an adjustable dimmer timer to control the switch in synchronization with the zero crossing detector.

2. The dimmer of claim 1, wherein:
    the dimmer timer being a monostable multivibrator comprising a first NPN transistor, a second NPN transistor, a PNP transistor and a series-connected capacitor-resistor pair;
    the first NPN transistor serving as a first inverter, the second NPN transistor and the PNP transistor with collectors connected together serving as a second inverter;
    the first inverter and the second inverter being coupled in cascade;
    the capacitor-resistor pair being coupled between the input of the first inverter and the output of the second inverter; and
    timing of the monostable being adjustable by varying the resistor of the capacitor-resistor pair.

3. The dimmer of claim 1, wherein the bleeder is turned on for at least a portion of each half cycle of the AC voltage prior to the zero crossing point of the voltage.

4. The dimmer of claim 1, wherein the bleeder is turned on when the instantaneous value of the output voltage of the rectifier is lower than a predetermined value.

5. The dimmer of claim 1, wherein the impedance of the bleeder is controlled according to the instantaneous value of the output voltage of the rectifier.

6. The dimmer of claim 1, wherein the zero crossing detector is comprising:
    further to the bleeder, a first comparator and a second comparator;
    the pulsating DC voltage being compared to a predetermined first reference by the first comparator, turning the impedance of the bleeder low when the voltage is lower than the first reference;

the pulsating DC voltage being compared to a predetermined second reference by the second comparator, output of which marking the zero crossing point of the voltage when said voltage drops below the second reference; and the second reference being lower than the first reference.

7. The dimmer of claim 1, wherein the zero crossing detector is comprising:

further to the bleeder, a power-on initiating unit, a first timer, a second timer, and a comparator;

wherein:

the power-on initiating unit turning the impedance of the bleeder low at power up period and then turning on the first timer;

during a first time period set by the first timer the impedance of the bleeder being kept high;

by the end of the first time period, the second timer being triggered on for a second time period during which the impedance of the bleeder is kept low;

the pulsating DC voltage being compared to a predetermined reference close to zero by the comparator, output of which marking the zero crossing point of the voltage when said voltage drops below the reference;

the first time period is set according to a predetermined level of dimming; and the second time period being set no more than half cycle period minus the first time period.

8. The dimmer of claim 1, wherein the zero crossing detector is comprising:

further to the bleeder, a comparator, wherein:

the impedance of the bleeder is controlled according to the instantaneous value of the voltage; and the pulsating DC voltage is compared to a predetermined reference close to zero by the comparator, output of which marking the zero crossing point of the voltage when said voltage drops below the reference.

9. The dimmer of claim 8, wherein the impedance of the bleeder is controlled proportional to the instantaneous value of the voltage.

10. A switch, comprising:

a first MOSFET and a second MOSFET connected in anti-series; the two source terminals of the MOSFETs being connected together to form a common source terminal and the two gate terminals of the MOSFETs being connected together to form a common gate terminal to receive a switch control signal; and a differential amplifier comprising a non-inverting input terminal, an inverting input terminal and an output terminal; wherein:

the negative voltage at the drain terminals of the MOSFETs is coupled to the non-inverting input terminal;

the positive voltage at the drain terminals of the MOSFETs is coupled to the inverting input terminal;

the common gate terminals of the MOSFETs is coupled to the output terminal of the amplifier;

in the event of over-current state of the switch, the negative voltage at the non-inverting input terminal drives the amplifier to turn off the switch control signal;

in the event of over-temperature state of the switch, the positive voltage at the inverting input terminal drives the amplifier to turn off the switch control signal;

whereby once the switch is turned off it is locked off until the end of the half cycle of the AC voltage.

11. The switch of claim 10, wherein:

the MOSFETs are N-channel MOSFETs;

the differential amplifier is an NPN bipolar transistor;

the non-inverting terminal of the amplifier is the emitter terminal of the bipolar transistor;

the inverting input terminal of the amplifier is the base terminal of the bipolar transistor;

the output terminal of the amplifier is the collector terminal of the bipolar transistor.

12. The dimmer of claim 1, wherein the switch is the switch of claim 11.

13. A method of phase cut dimming to control the amount of power delivered from an AC power source to a load, comprising:

turning on and turning off the current from the power source to the load by a switch;

converting the AC voltage from the power source by rectification to a pulsating DC voltage which is coupled to the switch;

detecting zero crossing points of the AC voltage through the pulsating DC voltage with a bleeder with a controllable impedance coupled to the output of the rectifier; and controlling the switch in synchronization with the zero crossing by an adjustable timer.

14. The method of claim 13, comprising further turning on the bleeder for at least a portion of each half cycle of the AC voltage prior to the zero crossing point of the voltage.

15. The method of claim 13, comprising further turning on the bleeder when the instantaneous value of the output voltage of the rectifier is lower than a predetermined value.

16. The method of claim 13, comprising further the controlling of the impedance of the bleeder according to the instantaneous value of the output voltage of the rectifier.

17. The method of claim 13, comprising further:

comparing the pulsating DC voltage to a predetermined first reference by a first comparator, turning the impedance of the bleeder from high to low when the voltage is lower than the first reference;

comparing the pulsating DC voltage to a predetermined second reference by a second comparator, output of which marking the zero crossing point of the voltage when said voltage drops below the second reference; and the second reference being lower than the first reference.

18. The method of claim 13, comprising further:

turning the impedance of the bleeder low during power up, and then turning on a first timer;

during a first time period set for the first timer, keeping the impedance of the bleeder high;

by the end of the first time period, turning on a second timer set for a second time period;

during the second time period, keeping the impedance of the bleeder low;

comparing the pulsating DC voltage to a predetermined reference close to zero by a comparator, the output of which marking the zero crossing point of the voltage when said voltage drops below the reference;

the first time period being set according to a predetermined level of power control; and the second time period being set no more than half cycle period minus the first time period.

19. The method of claim 13, comprising further:

controlling the impedance of the bleeder proportional to the instantaneous value of the voltage; and comparing the pulsating DC voltage to a predetermined reference close to zero by a comparator, output of which marking the zero crossing point of the voltage when said voltage drops below the reference.

20. A method of switching, comprising:
connecting a first MOSFET and a second MOSFET in anti-series; the two source terminals of the MOSFETs being connected together to form a common source terminal and the two gate terminals of the MOSFETs being connected together to form a common gate terminal to receive a switch control signal;
coupling the switch to a differential amplifier comprising a non-inverting input terminal, an inverting input terminal and an output terminal, wherein:
the negative voltage at the drain terminals of the MOSFETs is coupled to the non-inverting input terminal;
the positive voltage at the drain terminals of the MOSFETs is coupled to the inverting input terminal of the amplifier;
the common gate terminals of the MOSFETs is coupled to the output terminal of the amplifier;
in the event of over-current state of the switch and by the negative voltage at the non-inverting input terminal, driving the amplifier to turn off the switch control signal;
in the event of over-temperature state of the switch and by the positive voltage at the inverting input terminal, driving the amplifier to turn off the switch control signal;
whereby once the switch is turned off, it is locked off until the end of the half cycle of the AC voltage.

21. The method of claim 13, wherein the method for turning on and turning off the current from the power source to the load is the method of claim 20.

22. The method of claim 20, wherein:
the MOSFETs are N-channel MOSFETs;
the differential amplifier is an NPN bipolar transistor;
the non-inverting terminal of the amplifier is the emitter terminal of the bipolar transistor;
the inverting input terminal of the amplifier is the base terminal of the bipolar transistor;
the output terminal of the amplifier is the collector terminal of the bipolar transistor.

* * * * *